United States Patent
Wang et al.

(10) Patent No.: US 12,335,888 B2
(45) Date of Patent: Jun. 17, 2025

(54) METHOD FOR DETERMINING TIMING ADVANCE AND COMMUNICATION APPARATUS

(71) Applicant: HUAWEI TECHNOLOGIES CO., LTD., Shenzhen (CN)

(72) Inventors: Xiaolu Wang, Hangzhou (CN); Hejia Luo, Hangzhou (CN); Rong Li, Hangzhou (CN); Jun Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 17/953,705

(22) Filed: Sep. 27, 2022

(65) Prior Publication Data

US 2023/0027812 A1    Jan. 26, 2023

Related U.S. Application Data

(63) Continuation of application No. PCT/CN2021/078518, filed on Mar. 1, 2021.

(30) Foreign Application Priority Data

Mar. 31, 2020 (CN) .......................... 202010245958.2

(51) Int. Cl.
H04W 56/00 (2009.01)
(52) U.S. Cl.
CPC ..... *H04W 56/0045* (2013.01); *H04W 56/003* (2013.01)
(58) Field of Classification Search
CPC .................. H04W 56/0045; H04W 56/003
See application file for complete search history.

(56) References Cited

U.S. PATENT DOCUMENTS 10,602,534 B2 * 3/2020 Yan .................. H04W 72/1268
10,798,628 B2 * 10/2020 Tang ................. H04W 36/0072
(Continued)

FOREIGN PATENT DOCUMENTS

| CN | 102118801 A | 7/2011 |
| CN | 102883459 A | 1/2013 |

(Continued)

OTHER PUBLICATIONS

R1-1813673, Huawei et al., Discussion on Timing Advance for NTN, 3GPP TSG RAN WG1 Meeting #95, Spokane, USA, Nov. 12-16, 2018, 3 pages.

(Continued)

*Primary Examiner* — Bailor C Hsu
(74) *Attorney, Agent, or Firm* — HAUPTMAN HAM, LLP

(57) ABSTRACT

A method and a communication apparatus for determining a timing advance. A downlink signal is received from a network device. A first reference moment of a signal period of the downlink signal is determined, where the first reference moment includes a start receiving moment of the signal period. A first time interval between the start receiving moment and a start moment of a first period in which the terminal is located is determined. Based on the first time interval, determining whether a start sending moment of the signal period is within the first period, and determining the start sending moment, where a period is a duration distributed at an equal interval on a time axis. A timing advance is determined based on the start receiving moment and the start sending moment, and an uplink signal is sent based on the timing advance.

18 Claims, 11 Drawing Sheets

(56) References Cited

U.S. PATENT DOCUMENTS

| | | | | |
|---|---|---|---|---|
| 10,880,886 | B2* | 12/2020 | Tsai | H04W 56/0045 |
| 11,089,539 | B2* | 8/2021 | Zeng | H04W 48/10 |
| 2012/0294163 | A1* | 11/2012 | Turtinen | H04W 56/0045 |
| | | | | 370/252 |
| 2018/0213457 | A1* | 7/2018 | Tang | H04W 36/0072 |
| 2019/0387486 | A1 | 12/2019 | Abedini et al. | |
| 2021/0212004 | A1* | 7/2021 | Lu | H04W 56/001 |
| 2022/0174636 | A1* | 6/2022 | Liu | H04W 56/0045 |
| 2022/0369254 | A1* | 11/2022 | Miao | H04W 56/0045 |

FOREIGN PATENT DOCUMENTS

| | | | |
|---|---|---|---|
| CN | 102917393 | A | 2/2013 |
| CN | 103037499 | A | 4/2013 |
| CN | 108347763 | A | 7/2018 |
| CN | 105359596 | B | 5/2019 |
| WO | 2016191916 | A1 | 12/2016 |
| WO | 2018028340 | A1 | 2/2018 |

OTHER PUBLICATIONS

S2-175659, Huawei et al., TS 23.502 UPF relocation for NW triggered SR with invalid CN N3 tunnel info, SA WG2 Meeting #122BIS, Aug. 21-25, 2017, Sophia Antipolis, France, 15 pages.

Precision Timing and Reference Frequency, Accurate clock and frequency generation based on satellite positioning technology, Nov. 6, 2018, https://www.u-blox.com/en/technologies/precision-timing-and-reference-frequency-0, 3 pages.

R2-1912665, Zte Corporation et al., TP on RACH capacity evaluation and procedures, 3GPP TSG-RAN WG2 Meeting#107bis, Chongqing, China, Oct. 14-18, 2019, 10 pages.

Sun Jingjing et al, Synchronization Technologies in TD-SCDMA System, Modern Electronic Technology, No. 5, 2007, with the English Abstract, 3 pages.

* cited by examiner

METHOD FOR DETERMINING TIMING ADVANCE AND COMMUNICATION APPARATUS

CROSS-REFERENCE TO RELATED APPLICATIONS

This application is a continuation of International Application No. PCT/CN2021/078518 filed on Mar. 1, 2021, which claims priority to Chinese Patent Application No. 202010245958.2, filed on Mar. 31, 2020. The disclosures of the aforementioned applications are hereby incorporated by reference in their entireties.

BACKGROUND

Currently, research institutes are studying evolution from terrestrial communication technologies and protocols to non-terrestrial networks (NTN) communication technologies, and attempt to unify sky, air, and ground communication protocols to form an integrated communication network. NTN communication includes satellite communication, air-to-ground (ATG) communication, and the like. Compared with terrestrial communication, NTN communication has obviously different transmission features. NTN communication usually has a larger transmission delay. For example, round-trip time of geostationary earth orbit (GEO) satellite communication (regeneration mode) is 238 ms to 270 ms. Round-trip time of low earth orbit (LEO) satellite communication (orbit altitude 1200 km, regeneration mode) is 8 ms to 20 ms. In an ATG communication scenario, maximum round-trip time reaches 1 ms.

In the conventional technology, a maximum timing advance (TA) range indicated in a random access response (RAR) is 0 ms to 2 ms. As a subcarrier spacing increases, a TA range that is indicated in the RAR also decreases exponentially. In response to the subcarrier spacing being greater than 30 KHz, an indicated TA range in the RAR is less than 1 ms.

For an NTN communication scenario, the maximum TA range of 2 ms that is indicated in the RAR is insufficient to indicate round-trip time length in the NTN communication scenario.

SUMMARY

Embodiments described herein provide a method for determining a timing advance and a communication apparatus, to resolve a problem that a method for indicating a TA in an RAR is insufficient to indicate round-trip time length in an NTN communication scenario.

According to a first aspect, a method for determining a timing advance is provided. The method is applied to a terminal. The method is applied to but is not limited to a scenario of communicating with an NTN. The method is implemented by using the following steps: receiving a downlink signal from the network device, determining a first reference moment of a signal period of the downlink signal, determining a timing advance based on the first reference moment and a second reference moment, and sending an uplink signal to the network device based on the timing advance. The signal period is a period in which the network device sends the downlink signal, and the terminal receives the downlink signal at some or all moments in the signal period. The second reference moment is determined based on a first time interval. The first time interval is an interval between the first reference moment and a start moment of a first period. The first reference moment is located in the first period. A period is a duration distributed at an equal interval on a time axis. The first period is one of durations on the time axis.

In a design of forming the period by using the duration distributed at the equal interval on the time axis, and using a reference point at which the downlink signal periodically appears, the terminal determines the timing advance based on the first reference moment, the second reference moment, and the period. The network device does not need to indicate a value of the TA by using signaling. This effectively reduces signaling overheads for determining the TA on a terminal side. In response to the method being applied to the NTN scenario, a value of the TA in a long range is determined by using the method In at least one embodiment, to avoid a problem that a method for indicating a TA in an RAR is insufficient to indicate round-trip time in the NTN scenario. In a random access scenario, a timing range in which a random access preamble sent by the terminal arrives at the network device is large. According to the method In at least one embodiment, a length of a cyclic prefix of the random access preamble is reduced.

In at least one embodiment, the first reference moment is a start receiving moment of the signal period, and the second reference moment is a start sending moment of the signal period. The start receiving moment and the start sending moment of the signal period are used as reference moments, so that complexity of calculating the TA on the terminal side is reduced.

In at least one embodiment, the start sending moment is located in a second period, and the second period is a duration on the time axis. The method includes: determining whether the start receiving moment and the start sending moment are in a same period; and determining the start sending moment based on a determining result. By determining whether the start receiving moment and the start sending moment are in the same period, a determination is made whether the start sending moment is in the period of the start receiving moment or in a period preceding the period including the start receiving moment. Because a start moment of the period including the start receiving moment is obtained by the terminal through measurement, the start sending moment is further calculated, to determine a value of the TA.

There are several optional manners for determining whether the start receiving moment and the start sending moment are in the same period.

Optional manner 1: An interval between the start sending moment and a start moment of a second period is a second time interval. In response to the first time interval not being less than the second time interval, the start receiving moment and the start sending moment are in a same period, and the second period and the first period are a same period. Alternatively, In response to the first time interval being less than the second time interval, the start receiving moment and the start sending moment are not in a same period, and the first period is a period following the second period.

Optionally, in response to the determining that the start receiving moment and the start sending moment are in the same period, the start sending moment is a moment obtained by postponing the start moment of the first period by the second time interval. In response to the determining that the start receiving moment and the start sending moment are not in the same period, the start sending moment is a moment obtained by postponing the start moment of the second period by the second time interval. The start moment of the second period is a moment obtained by advancing the start moment of the first period by a period.

This method is applicable in response to the period being greater than a maximum one-way delay. The following optional manner 2 is not only applicable to a case in which the period is greater than the maximum one-way delay, but also applicable to a case in which the period is less than or equal to the maximum one-way delay.

Optional manner 2: The method includes: receiving first indication information from the network device. The first indication information indicates an attribute of a duration sequence number of the second period on the time axis, and the attribute includes an odd number or an even number. The method includes determining, based on the first indication information, whether attributes of duration sequence numbers of the first period and the second period on the time axis are the same. In response to the attributes of the duration sequence numbers of the first period and the second period on the time axis being the same, a determination is made that the start receiving moment and the start sending moment are in the same period, and the second period and the first period are a same period. In response to the attributes of the duration sequence numbers of the first period and the second period on the time axis not being the same, a determination is made that the start receiving moment and the start sending moment are not in the same period, and the first period is a period following the second period.

In at least one embodiment, the method includes receiving second indication information from the network device. The second indication information indicates a reference signal period. A difference between a start sending moment of the reference signal period and a start moment of a third period is a first fixed value. The first fixed value is any value greater than or equal to 0. The start sending moment of the reference signal period is located in the third period. The method includes: determining the second time interval based on a distance between a start moment of the signal period of the downlink signal and the start sending moment of the reference signal period. The second time interval is obtained by adding the distance and the first fixed value and then performing a modulo operation on one period. Optionally, the first fixed value is also less than 0 In this way, the second time interval is a value obtained by subtracting the first fixed value from the distance and then performing a modulo operation on one period. In this way, the terminal calculates the second time interval by indicating the first fixed value, thereby further reducing signaling overheads.

In at least one embodiment, the method includes: receiving third indication information from the network device, where the third indication information indicates the second time interval. The second time interval is a time value or a quantity. The quantity indicates a quantity of time units included in the second time interval. The period is divided into a plurality of time units. This design provides a more flexible manner of indicating the second time interval.

In at least one embodiment, the determining the timing advance based on the start receiving moment and the start sending moment is implemented in any one of the following manners: The timing advance is a difference multiplied by two, and the difference is a difference between the start receiving moment and the start sending moment; or the timing advance is a sum or a difference between a difference multiplied by 2 and an adjustment value, and the adjustment value is related to a signal processing time and/or relative movement between the network device and the terminal.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

According to a second aspect, a method for determining a timing advance is provided. The method is performed by a terminal. The method is implemented by using the following steps: receiving a downlink signal from the network device, determining a first reference moment of a signal period of the downlink signal, determining a timing advance based on the first reference moment and a second reference moment, and sending an uplink signal to the network device based on the timing advance. The signal period is a period in which the network device sends a downlink signal. A length of a period is M times a length of the signal period. M is a value greater than 0. The period is a duration distributed at an equal interval on a time axis. In response to M=1, the length of the period is the same as the length of the signal period. M is a value greater than 1, and the length of the period is greater than the length of the signal period. Alternatively, M is a value less than 1, and the length of the period is less than the length of the signal period. The second reference moment is aligned with or differs from a start moment of the period by a fixed value. Alternatively, the second reference moment is aligned with or differs from any specified moment of the period by a fixed value. The fixed value is a value greater than 0, less than 0, or equal to 0.

By designing of forming the period by using the duration distributed at the equal interval on the time axis, using a reference point at which the downlink signal periodically appears, and setting a relationship between the signal period and the period, In response to a terminal measuring the downlink signal, a start sending moment of a period at which the network device sends a signal is deduced based on time of the downlink signal, to further determine the timing advance. The network device does not need to indicate a value of the TA by using signaling, so that signaling overheads for determining the TA on a terminal side is effectively reduced. In response to the method being applied to the NTN scenario, a value of the TA in a long range is determined by using the method In at least one embodiment, to avoid a problem that a method for indicating a TA in an RAR is insufficient to indicate round-trip time in the NTN scenario. In a random access scenario, a timing range in which a random access preamble sent by the terminal arrives at the network device is large. According to the method In at least one embodiment, a length of a cyclic prefix of the random access preamble is reduced.

In at least one embodiment, the first reference moment is a start receiving moment of the signal period, and the second reference moment is a start sending moment of the signal period. The start receiving moment and the start sending moment of the signal period are used as reference moments, so that complexity of calculating the TA on the terminal side is reduced.

In at least one embodiment, M=1, and the length of the period is the same as the length of the signal period, the terminal determines, based on the first reference moment, a start moment of a first period in which the first reference moment is located. The terminal determines, based on the start moment of the first period and a second fixed value, the start sending moment of the signal period.

M>1, that is, the period is M times the signal period. After determining the first reference moment, the terminal determines which 1/M of the first period the first reference moment is in, to determine the start moment of the first period. The terminal determines the start sending moment of the signal period based on the start moment of the first period, a $1/M^{th}$ 1/M of the first reference moment, and the second fixed value.

In at least one embodiment, the second fixed value is equal to 0, and the start sending moment is the start moment of the period. Alternatively, the second fixed value is less than 0, and the start sending moment obtained by advancing the start moment of the period by the fixed value. Alternatively, the second fixed value is greater than 0, and the start sending moment is obtained by postponing the start moment of the period by the fixed value.

In at least one embodiment, the method includes receiving indication information from the network device, where the indication information indicates the length of the signal period. A specific value of the length of the signal period is indicated, or one bit is used to indicate whether a first value or a second value is selected for the signal period. The first value is a newly defined value, and the second value is a value of a regular modification period of system information.

In at least one embodiment, the length of the signal period is a positive integer multiple of 250 ms.

In at least one embodiment, the determining the timing advance based on the start receiving moment and the start sending moment is implemented in any one of the following manners: The timing advance is a difference multiplied by two, and the difference is a difference between the start receiving moment and the start sending moment; or the timing advance is a sum or a difference between a difference multiplied by 2 and an adjustment value, and the adjustment value is related to a signal processing time and/or relative movement between the network device and the terminal.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

According to a third aspect, a method for determining a timing advance is provided. The method is applied to a network device. The method is applied to but is not limited to a scenario of communicating with an NTN. The method is implemented by using the following steps: sending indication information to a terminal, where the indication information determines, for the terminal, a timing advance for sending an uplink signal; and receiving the uplink signal from the terminal. The indication information indicates information about a time interval. The time interval is an interval between a reference moment and a start moment of a period. The reference moment is located in the period. The period is one of durations distributed at equal intervals on a time axis. Alternatively, the indication information indicates an attribute of a duration sequence number of the period on the time axis. The attribute includes an odd number or an even number. Alternatively, the indication information indicates a reference signal period. A difference between a start moment of the reference signal period and a start moment of a period in which the start moment is located is a fixed value. The fixed value is greater than 0, less than 0, or equal to 0.

By designing of forming the period by using the duration distributed at the equal interval on the time axis, and using a reference point at which the downlink signal periodically appears, some information related to the period is indicated to the terminal by using indication information, so that the terminal determines the timing advance based on the indication information. The network device does not need to indicate a value of the TA by using signaling, so that signaling overheads for determining the TA on a terminal side is effectively reduced. In response to the method being applied to the NTN scenario, a value of the TA in a long range is determined by using the method In at least one embodiment, to avoid a problem that a method for indicating a TA in an RAR is insufficient to indicate round-trip time in the NTN scenario. In a random access scenario, a timing range in which a random access preamble sent by the terminal arrives at the network device is large. According to the method in at least one embodiment, a length of a cyclic prefix of the random access preamble is reduced.

In at least one embodiment, the method includes periodically sending a downlink signal based on a signal period. A start sending moment of the signal period is the reference moment, or the start sending moment of the signal period is a moment determined by combining the reference moment and a delay compensation value. A delay compensation value is used to reduce round-trip time.

In at least one embodiment, in response to the first indication information indicating the information about the time interval, the first indication information is a time value or a quantity. The quantity indicates a quantity of time units included in the time interval. The period is divided into a plurality of time units. This design provides a more flexible manner of indicating the time interval.

According to a fourth aspect, a method for determining a timing advance is provided. The method is applied to a network device. The method is applied to but is not limited to a scenario of communicating with an NTN. The method is implemented by using the following steps: sending a downlink signal based on a signal period. A length of a period is M times a length of the signal period. M is a value greater than 0, and the period is a duration distributed at an equal interval on a time axis. In response to M=1, the length of the period is the same as the length of the signal period. M is a value greater than 1, and the length of the period is greater than the length of the signal period. Alternatively, M is a value less than 1, and the length of the period is less than the length of the signal period. A difference between a start moment of the signal period and a start moment of the period is a fixed value. The fixed value is greater than 0, less than 0, or equal to 0. The fixed value is used by a terminal to determine a timing advance for sending an uplink signal. The method includes: receiving the uplink signal from the terminal.

By designing of forming the period by using the duration distributed at the equal interval on the time axis, using a reference point at which the downlink signal periodically appears, and setting a relationship between the signal period and the period, In response to a terminal measuring the downlink signal, a start sending moment of a period at which the network device sends a signal is deduced based on time of the downlink signal, to further determine the timing advance. The network device does not need to indicate a value of the TA by using signaling, so that signaling overheads for determining the TA on a terminal side is effectively reduced. In response to the method being applied to the NTN scenario, a value of the TA in a long range is determined by using the method in at least one embodiment, to avoid a problem that a method for indicating a TA in an RAR is insufficient to indicate round-trip time in the NTN scenario. In a random access scenario, a timing range in which a random access preamble sent by the terminal arrives at the network device is large. According to the method in at least one embodiment, a length of a cyclic prefix of the random access preamble is reduced.

In at least one embodiment, the fixed value is equal to 0, and the start sending moment is the start moment of the period. Alternatively, the fixed value is less than 0, and the start sending moment obtained by advancing the start moment of the period by the fixed value. Alternatively, the fixed value is greater than 0, and the start sending moment is obtained by postponing the start moment of the period by the fixed value.

In at least one embodiment, the method includes sending indication information to the terminal, where the indication information indicates the length of the signal period. A specific value of the length of the signal period is indicated, or one bit is used to indicate whether a first value or a second value is selected for the signal period. The first value is a newly defined value, and the second value is a value of a regular modification period of system information.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

In at least one embodiment, the length of the signal period is a positive integer multiple of 250 ms.

According to a fifth aspect, a communication apparatus is provided. The apparatus is a terminal device, is an apparatus (for example, a chip, a chip system, or a circuit) in a terminal device, or is an apparatus that is used with a terminal device. The apparatus has a function of implementing the method in any one of the first aspect. The function is implemented by hardware, or is implemented by hardware executing corresponding software. The hardware or the software includes one or more modules corresponding to the foregoing function. In a design, the apparatus includes a communication module and a processing module. For example:

The communication module is configured to receive a downlink signal from a network device. The processing module is configured to: determine a first reference moment of a signal period of the downlink signal, and determine a timing advance based on the first reference moment and a second reference moment. The communication module is further configured to send an uplink signal to the network device based on the timing advance. The signal period is a period in which the network device sends the downlink signal, and the terminal receives the downlink signal at some or all moments in the signal period. The second reference moment is determined based on a first time interval. The first time interval is an interval between the first reference moment and a start moment of a first period. The first reference moment is located in the first period. A period is a duration distributed at an equal interval on a time axis. The first period is one of durations on the time axis.

For beneficial effects of the fifth aspect, refer to the descriptions of the first aspect. Details are not described herein again.

In at least one embodiment, the first reference moment is a start receiving moment of the signal period, and the second reference moment is a start sending moment of the signal period. The start receiving moment and the start sending moment of the signal period are used as reference moments, so that complexity of calculating the TA on the terminal side is reduced.

In at least one embodiment, the start sending moment is located in a second period, and the second period is a duration on the time axis. The processing module is further configured to: determine whether the start receiving moment and the start sending moment are in a same period; and determine the start sending moment based on a determining result. By determining whether the start receiving moment and the start sending moment are in the same period, a determination is made whether the start sending moment is in the period of the start receiving moment or in a period preceding the period including the start receiving moment. Because a start moment of the period including the start receiving moment is obtained by the terminal through measurement, the start sending moment is further calculated, to determine a value of the TA.

Determining whether the start receiving moment and the start sending moment are in the same period, is implemented by the processing module in the following several optional manners.

Optional manner 1: An interval between the start sending moment and a start moment of a second period is a second time interval. The processing module is configured to: in response to the first time interval not being less than the second time interval, determine that the start receiving moment and the start sending moment are in a same period, and the second period and the first period are a same period. Alternatively, the processing module is configured to: in response to the first time interval being less than the second time interval, determine that the start receiving moment and the start sending moment are not in a same period, and the first period is a period following the second period.

Optionally, In response to the determining that the start receiving moment and the start sending moment are in the same period, the start sending moment is a moment obtained by postponing the start moment of the first period by the second time interval. In response to the determining that the start receiving moment and the start sending moment are not in the same period, the start sending moment is a moment obtained by postponing the start moment of the second period by the second time interval. The start moment of the second period is a moment obtained by advancing the start moment of the first period by a period.

This method is applicable In response to the period being greater than a maximum one-way delay. The following optional manner 2 is not only applicable to a case in which the period is greater than the maximum one-way delay, but also applicable to a case in which the period is less than or equal to the maximum one-way delay.

Optional manner 2: The communication module is configured to receive first indication information from the network device. The first indication information indicates an attribute of a duration sequence number of the second period on the time axis, and the attribute includes an odd number or an even number. The communication module is configured to determine, based on the first indication information, whether attributes of duration sequence numbers of the first period and the second period on the time axis are the same. In response to the attributes of the duration sequence numbers of the first period and the second period on the time axis being the same, a determination is made that the start receiving moment and the start sending moment are in the same period, and the second period and the first period are a same period. In response to the attributes of the duration sequence numbers of the first period and the second period on the time axis not being the same, a determination is made that the start receiving moment and the start sending moment are not in the same period, and the first period is a period following the second period.

In at least one embodiment, the communication module is configured to receive second indication information from the network device. The second indication information indicates a reference signal period. A difference between a start sending moment of the reference signal period and a start moment of a third period is a first fixed value. The first fixed value is any value greater than or equal to 0. The start sending moment of the reference signal period is located in the third period. The communication module is configured to determine the second time interval based on a distance between a start moment of the signal period of the downlink signal and the start sending moment of the reference signal period. The second time interval is obtained by adding the distance and the first fixed value and then performing a modulo operation on one period. Optionally, the first fixed value is also less than 0. In this way, the second time interval is a value obtained by subtracting the first fixed value from the distance and then performing a modulo operation on one period. In this way, the terminal calculates the second time interval by indicating the first fixed value, thereby further reducing signaling overheads.

In at least one embodiment, the communication module is configured to receive third indication information from the network device. The third indication information indicates the second time interval. The second time interval is a time value or a quantity. The quantity indicates a quantity of time units included in the second time interval. The period is divided into a plurality of time units. This design provides a more flexible manner of indicating the second time interval.

In at least one embodiment, that the processing module determines the timing advance based on the start receiving moment and the start sending moment is implemented in any one of the following manners: The timing advance is a difference multiplied by two, and the difference is a difference between the start receiving moment and the start sending moment; or the timing advance is a sum or a difference between a difference multiplied by 2 and an adjustment value, and the adjustment value is related to a signal processing time and/or relative movement between the network device and the terminal.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

According to a sixth aspect, a communication apparatus is provided. The apparatus is a terminal device, is an apparatus (for example, a chip, a chip system, or a circuit) in a terminal device, or is an apparatus that is used with a terminal device. In a design, the apparatus includes modules that are in one-to-one correspondence with the methods/operations/steps/actions described in the second aspect. The modules is implemented by using a hardware circuit, software, or a combination of the hardware circuit and the software. In a design, the apparatus includes a processing module and a communication module. The processing module is configured to invoke the communication module to perform a receiving function and/or a sending function.

For example, the communication module is configured to receive a downlink signal from a network device. The processing module is configured to: determine a first reference moment of a signal period of the downlink signal, and determine a timing advance based on the first reference moment and a second reference moment. The communication module is further configured to send an uplink signal to the network device based on the timing advance. The signal period is a period in which the network device sends a downlink signal. A length of a period is M times a length of the signal period. M is a value greater than 0. The period is a duration distributed at an equal interval on a time axis. In response to M=1, the length of the period is the same as the length of the signal period. M is a value greater than 1, and the length of the period is greater than the length of the signal period. Alternatively, M is a value less than 1, and the length of the period is less than the length of the signal period. The second reference moment is aligned with or differs from a start moment of the period by a fixed value. Alternatively, the second reference moment is aligned with or differs from any specified moment of the period by a fixed value. The fixed value is a value greater than 0, less than 0, or equal to 0.

For beneficial effects of the sixth aspect, refer to the descriptions of the second aspect. Details are not described herein again.

In at least one embodiment, the first reference moment is a start receiving moment of the signal period, and the second reference moment is a start sending moment of the signal period. The start receiving moment and the start sending moment of the signal period are used as reference moments, so that complexity of calculating the TA on the terminal side is reduced.

In at least one embodiment, M=1, and the length of the period is the same as the length of the signal period, the processing module is configured to: determine, based on the first reference moment, a start moment of a first period in which the first reference moment is located, and determine, based on the start moment of the first period and a second fixed value, the start sending moment of the signal period.

M>1, that is, the period is M times the signal period. After determining the first reference moment, the processing module is configured to determine which 1/M of the first period the first reference moment is in, to determine the start moment of the first period. The terminal determines the start sending moment of the signal period based on the start moment of the first period, a $1/M^{th}$ 1/M of the first reference moment, and the second fixed value.

In at least one embodiment, the second fixed value is equal to 0, and the start sending moment is the start moment of the period. Alternatively, the second fixed value is less than 0, and the start sending moment obtained by advancing the start moment of the period by the fixed value. Alternatively, the second fixed value is greater than 0, and the start sending moment is obtained by postponing the start moment of the period by the fixed value.

In at least one embodiment, the communication module is configured to receive indication information from the network device, where the indication information indicates the length of the signal period. A specific value of the length of the signal period is indicated, or one bit is used to indicate whether a first value or a second value is selected for the signal period. The first value is a newly defined value, and the second value is a value of a regular modification period of system information.

In at least one embodiment, the length of the signal period is a positive integer multiple of 250 ms.

In at least one embodiment, that the processing module determines the timing advance based on the start receiving moment and the start sending moment is implemented in any one of the following manners: The timing advance is a difference multiplied by two, and the difference is a difference between the start receiving moment and the start sending moment; or the timing advance is a sum or a difference between a difference multiplied by 2 and an adjustment value, and the adjustment value is related to a signal processing time and/or relative movement between the network device and the terminal.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

According to a seventh aspect, a communication apparatus is provided. The apparatus is a network device, is an apparatus (for example, a chip, a chip system, or a circuit) in a network device, or is an apparatus that is used with a network device. In a design, the apparatus includes modules that are in one-to-one correspondence with the methods/operations/steps/actions described in the third aspect. The modules is implemented by using a hardware circuit, software, or a combination of the hardware circuit and the software. In a design, the apparatus includes a processing module and a communication module. The processing module is configured to invoke the communication module to perform a receiving function and/or a sending function.

For example, the processing module is configured to: invoke the communication module to send indication information to a terminal, where the indication information determines, for the terminal, a timing advance for sending an uplink signal; and invoke the communication module to receive the uplink signal from the terminal. The indication information indicates information about a time interval. The time interval is an interval between a reference moment and a start moment of a period. The reference moment is located in the period. The period is one of durations distributed at equal intervals on a time axis. Alternatively, the indication information indicates an attribute of a duration sequence number of the period on the time axis. The attribute includes an odd number or an even number. Alternatively, the indication information indicates a reference signal period. A difference between a start moment of the reference signal period and a start moment of a period in which the start moment is located is a fixed value. The fixed value is greater than 0, less than 0, or equal to 0.

For beneficial effects of the seventh aspect, refer to the descriptions of the third aspect. Details are not described herein again.

In at least one embodiment, In response to the processing module invoking the communication module to periodically send a downlink signal based on a signal period, a start sending moment of the signal period is the reference moment, or the start sending moment of the signal period is a moment determined by combining the reference moment and a delay compensation value. A delay compensation value is used to reduce round-trip time.

In at least one embodiment, In response to the first indication information indicating the information about the time interval, the first indication information is a time value or a quantity. The quantity indicates a quantity of time units included in the time interval. The period is divided into a plurality of time units. This design provides a more flexible manner of indicating the time interval.

According to an eighth aspect, a communication apparatus is provided. The apparatus is a network device, is an apparatus (for example, a chip, a chip system, or a circuit) in a network device, or is an apparatus that is used with a network device. In a design, the apparatus includes modules that are in one-to-one correspondence with the methods/operations/steps/actions described in the fourth aspect. The modules is implemented by using a hardware circuit, software, or a combination of the hardware circuit and the software. In a design, the apparatus includes a processing module and a communication module. The processing module is configured to invoke the communication module to perform a receiving function and/or a sending function.

For example: the processing module is configured to invoke the communication module to send a downlink signal based on a signal period. A length of a period is M times a length of the signal period. M is a value greater than 0. The period is a duration distributed at an equal interval on a time axis. In response to M=1, the length of the period is the same as the length of the signal period. M is a value greater than 1, and the length of the period is greater than the length of the signal period. Alternatively, M is a value less than 1, and the length of the period is less than the length of the signal period. A difference between a start moment of the signal period and a start moment of the period is a fixed value. The fixed value is greater than 0, less than 0, or equal to 0. The fixed value is used by a terminal to determine a timing advance for sending an uplink signal. The processing module is further configured to invoke the communication module to receive the uplink signal from the terminal.

For beneficial effects of the eighth aspect, refer to beneficial effects of the fourth aspect.

In at least one embodiment, the fixed value is equal to 0, and the start sending moment is the start moment of the period. Alternatively, the fixed value is less than 0, and the start sending moment obtained by advancing the start moment of the period by the fixed value. Alternatively, the fixed value is greater than 0, and the start sending moment is obtained by postponing the start moment of the period by the fixed value.

In at least one embodiment, In response to the processing module is configured to invoke the communication module to send indication information to the terminal, the indication information indicates the length of the signal period. A specific value of the length of the signal period is indicated, or one bit is used to indicate whether a first value or a second value is selected for the signal period. The first value is a newly defined value, and the second value is a value of a regular modification period of system information.

Optionally, the signal period is a modification period of system information. In this way, after obtaining a system modification period, the terminal obtains the signal period, so that signaling overheads of sending the signal period configuration by the network device to the terminal is reduced, and power consumption of receiving signaling by the terminal is also reduced.

In at least one embodiment, the length of the signal period is a positive integer multiple of 250 ms.

According to a ninth aspect, at least one embodiment provides a communication apparatus. The apparatus includes a communication interface and a processor. The communication interface is configured for communication between the apparatus and another device, for example, data or signal receiving and sending. For example, the communication interface is a transceiver, a circuit, a bus, a module, or a communication interface of another type, and the another device is a network device or a node. The processor is configured to invoke a group of programs, instructions, or data, to perform the method described in the first aspect, the second aspect, the first aspect, or the second aspect. The apparatus further includes a memory, configured to store the programs, the instructions, or the data invoked by the processor. The memory is coupled to the processor. In response to executing the instructions or the data stored in the memory, the processor implements the method described in the first aspect, or the second aspect.

According to a tenth aspect, at least one embodiment provides a communication apparatus. The apparatus includes a communication interface and a processor. The communication interface is configured for communication between the apparatus and another device, for example, data or signal receiving and sending. For example, the communication interface is a transceiver, a circuit, a bus, a module, or a communication interface of another type, and the another device is a network device or a node. The processor is configured to invoke a group of programs, instructions, or data, to perform the method described in the third aspect, or the fourth aspect. The apparatus further includes a memory, configured to store the programs, the instructions, or the data invoked by the processor. The memory is coupled to the processor. In response to executing the instructions or the data stored in the memory, the processor implements the method described in the third aspect, or the fourth aspect.

According to an eleventh aspect, at least one embodiment further provides a computer-readable storage medium. The computer-readable storage medium stores computer-readable instructions, and in response to the computer-readable instructions being run on a computer, the method according to the first aspect, or the second aspect is performed.

According to a twelfth aspect, at least one embodiment further provides a computer-readable storage medium. The computer-readable storage medium stores computer-readable instructions. In response to the computer-readable instructions being run on a computer, the method according to the third aspect, or the fourth aspect is performed.

According to a fourteenth aspect, at least one embodiment provides a chip system. The chip system includes a processor, and further includes a memory, configured to implement the method in the first aspect, or the second aspect. The chip system includes a chip, or includes a chip and another discrete component.

According to a fifteenth aspect, at least one embodiment provides a chip system. The chip system includes a processor, and further includes a memory, configured to implement the method in the third aspect, or the fourth aspect. The chip system includes a chip, or includes a chip and another discrete component.

According to a sixteenth aspect, at least one embodiment provides a communication system, where the system includes a terminal device and a network device. The terminal device is configured to perform the method in the first aspect, or the second aspect. The network device is configured to perform the method in the third aspect, or the fourth aspect.

According to a seventeenth aspect, a computer program product including instructions is provided. In response to the computer program product running on a computer, the method in the first aspect, or the second aspect is performed.

According to an eighteenth aspect, a computer program product including instructions is provided. In response to the computer program product running on a computer, the method in the third aspect, or the fourth aspect is performed.

DESCRIPTION OF EMBODIMENTS

Embodiments described herein provide a method for determining a TA and a communication apparatus. The method and the apparatus are based on a same technical idea. Because problem-resolving principles of the method and the apparatus are similar, mutual reference is made to implementations of the apparatus and the method, and repeated parts are not described again. In descriptions of at least one embodiment, the term "and/or" describes an association relationship between associated objects and indicates that three relationships exist. For example, A and/or B indicates the following three cases: Only A exists, both A and B exist, and only B exists. The character "/" generally indicates an "or" relationship between the associated objects. In embodiments described herein, "at least one" means one or more, and "a plurality of" means two or more. In addition, in at least one embodiment, terms such as "first", "second", and "third" are merely used to distinguish the purpose of the description, but cannot be understood as an indication or implication of relative importance, or as an indication or implication of a sequence.

A method for determining the timing advance provided in at least one embodiments applied to a 4th generation (4G) communication system, for example, a long term evolution (LTE) system, or is applied to a 5th generation (5G) communication system, for example, a 5G new radio (NR), or applied to various future communication systems, for example, a 6th generation (6G) communication system. The method provided in at least one embodiment is applied to a terrestrial network communication system, or is applied to an NTN communication system.

Figure 1:
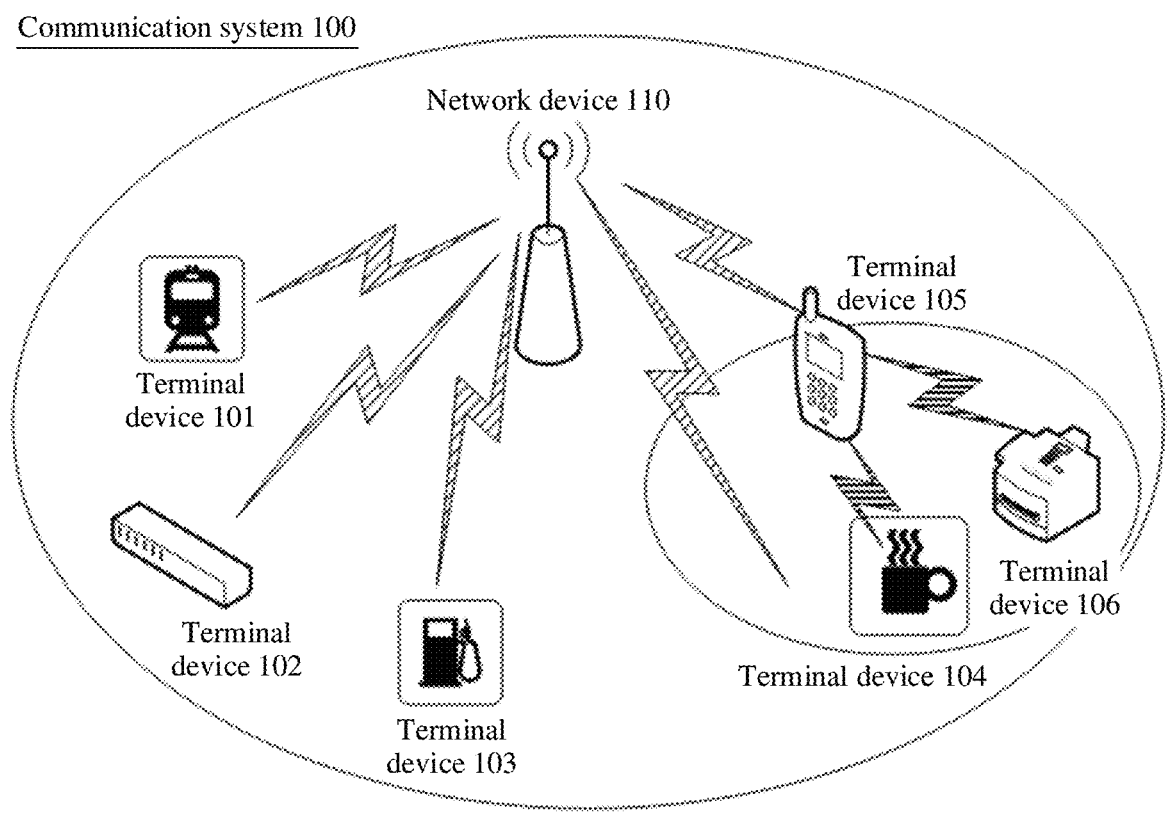
FIG. 1 is a schematic architectural diagram of a terrestrial network communication system according to at least one embodiment.

FIG. 1 shows an architecture of a terrestrial network communication system to which a method for determining a timing advance according to at least one embodiment is applicable. A communication system 100 includes a network device 110 and terminal devices 101 to 106. The communication system 100 includes more or fewer network devices or terminal devices. The network device or the terminal device is hardware, is software obtained through functional division, or is a combination thereof. In addition, the terminal device 104 to the terminal device 106 also forms a communication system. For example, the terminal device 105 sends downlink data to the terminal device 104 or the terminal device 106. The network device and the terminal device communicates with each other through another device or network element. A network device 110 sends downlink data to the terminal device 101 to the terminal device 106, or receives uplink data sent by the terminal device 101 to the terminal device 106. Certainly, the terminal device 101 to the terminal device 106 alternatively sends uplink data to the network device 110, or receives downlink data sent by the network device 110.

The network device 110 is a node in a radio access network (RAN), and is also referred to as a base station or a RAN node (or device). Currently, some examples of the terminal device 101 are: a gNB/NR-NB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless fidelity (Wi-Fi) access point (AP), a network device in a 5G communication system, and a network device in a communication system in the future. The network device 110 is alternatively another device that has a function of the network device. For example, the network device 110 alternatively is a device that functions as a network device in vehicle-to-everything communication or D2D communication. The network device 110 is alternatively a network device in a communication system.

The terminal devices 101 to 106 are also referred to as user equipment (UE), a mobile station (MS), a mobile terminal (MT), or the like, and is a device that provides a user with voice or data connectivity, or is an internet of things device. For example, the terminal devices 101 to 106 each include a handheld device, a vehicle-mounted device, or the like that has a wireless connection function. Currently, the terminal devices 101 to 106 each is a mobile phone, a tablet computer, a notebook computer, a palmtop computer, a mobile internet device (MID), a wearable device (for example, a smartwatch, a smart band, or a pedometer), a vehicle-mounted device (for example, a vehicle-mounted device on an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self-driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. The terminal devices 101 to 106 are alternatively other devices that have a terminal function. For example, the terminal devices 101 to 106 are alternatively devices that perform a terminal function in D2D communication, machine-to-machine communication, or vehicle-to-everything communication.

Figure 2:
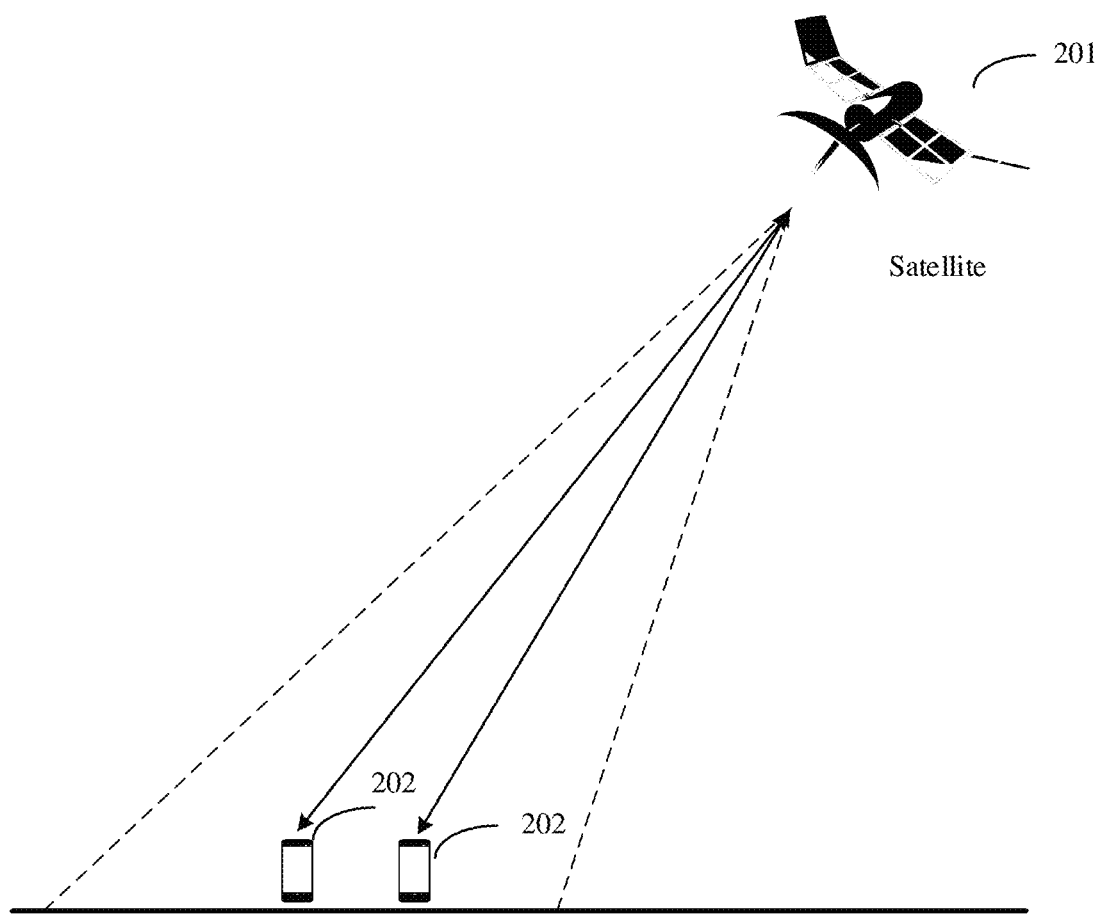
FIG. 2 is a schematic architectural diagram of a non-terrestrial network communication system according to at least one embodiment.

Based on the description of the architecture of the terrestrial network communication system shown in FIG. 1, the method for determining the timing advance provided according to at least one embodiment is applicable to an NTN communication system. As shown in FIG. 2, the NTN communication system includes a satellite 201 and terminal devices 202. For explanation of the terminal device 202, refer to the related descriptions of the terminal devices 101 to 106. The satellite 201 is also referred to as a high-altitude platform, a high-altitude aircraft, or a satellite base station. In response to the NTN communication system being associated with the terrestrial network communication system, the satellite 201 is considered as one or more network devices in the architecture of the terrestrial network communication system. The satellite 201 provides a communication service for the terminal devices 202, and the satellite 201 is further connected to a core network device. For a structure and a function of the satellite 201, refer to the foregoing descriptions of the satellite 201. For a communication manner between the satellite 201 and the terminal devices 202, refer to the descriptions in FIG. 1. Details are not described herein.

Figure 3:
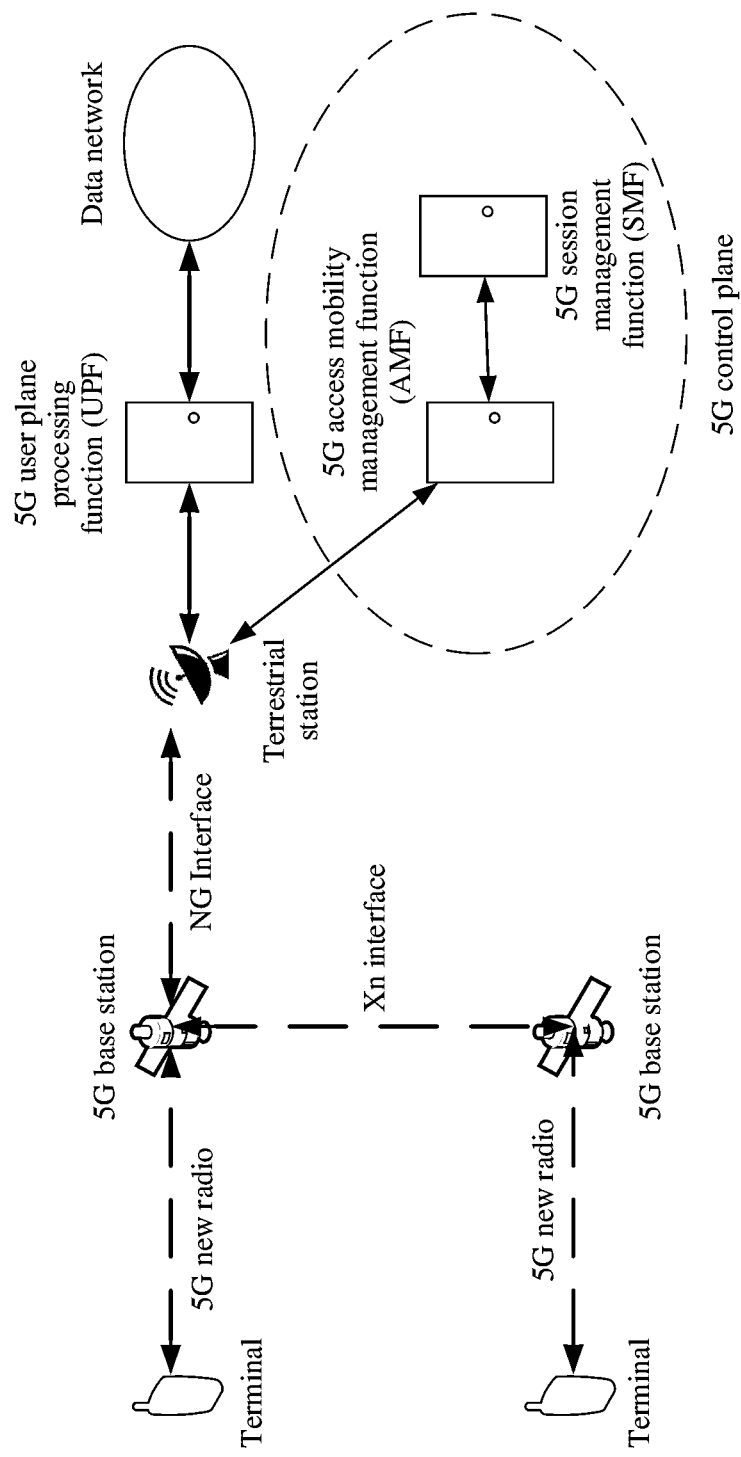
FIG. 3 is a schematic architectural diagram of a 5G satellite communication system according to at least one embodiment.

5G is used as an example. An architecture of a 5G satellite communication system is shown in FIG. 3. A terrestrial terminal device accesses a network through a 5G new radio interface. A 5G base station is deployed on a satellite and is connected to a terrestrial core network through a radio link. In addition, there are radio links between satellites to implement signaling exchange and user data transmission between base stations. The devices and interfaces in FIG. 3 are described as follows.

5G core network: The 5G core network provides services such as user access control, mobility management, session management, user security authentication, and accounting. The 5G core network includes a plurality of functional units, and is divided into a control-plane functional entity and a data-plane functional entity. An access and mobility management unit (AMF) is responsible for user access management, security authentication, and mobility management. A user plane unit (UPF) manages user-plane data transmission, traffic statistics collection, and lawful interception.

A ground station is responsible for forwarding signaling and service data between a satellite base station and a 5G core network.

5G new radio: The 5G new radio is a radio link between a terminal and a 5G base station.

Xn interface: The Xn interface is an interface between a 5G base station and a base station, and is used for switching signaling exchange and the like.

NG interface: The NG interface is an interface between a 5G base station and a 5G core network, and is mainly used for exchange of NAS signaling of the core network and user service data.

In an NTN communication system, in response to a satellite working in a regeneration mode, the satellite is considered as a base station, or the satellite has some functions of the base station. In response to the satellite working in the transparent transmission mode, a gateway station is considered as a base station, or the gateway station has some functions of the base station.

In at least one embodiment, the network device in the terrestrial network communication system and the satellite in the NTN communication system is uniformly considered as network devices. An apparatus configured to implement a function of a network device is a network device, or is an apparatus, for example, a chip system, that supports the network device in implementing the function. The apparatus is mounted in the network device. In response to the technical solutions provided according to at least one embodiment described below, an example in which the apparatus configured to implement a function of a network device being a satellite is used to describe the technical solutions provided in at least one embodiment. In response to the method provided in at least one embodiment being applied to the terrestrial network communication system, an action performed by the satellite is performed by a base station or a network device.

In at least one embodiment, an apparatus configured to implement a function of a terminal device is a terminal device, or is an apparatus, for example, a chip system, that supports the terminal device in implementing the function. The apparatus is mounted in the terminal device. In at least one embodiment, the chip system includes a chip, or includes a chip and another discrete component. In the technical solutions provided according to at least one embodiment, an example in which the apparatus configured to implement a function of a terminal device is a terminal or UE is used to describe the technical solutions provided according to at least one embodiment.

The following describes in detail embodiments with reference to accompanying drawings.

Concepts of several terms mentioned in at least one embodiment are first explained, to facilitate understanding of embodiments described herein.

(1) Signal Period:

The signal period is a period in which a network device sends a downlink signal to the terminal by using a length of the period as a metric. The terminal receives the downlink signal from the network device based on the signal period. Alternatively, the signal period is an update period of the downlink signal. The network device indicates the signal period to the terminal, and the terminal receives the signal period from the network device. The signal period is a period in which the network device sends any signal.

Optionally, the signal period is a modification period of system information. The modification period indicates a period for the system to update system information. A start system frame of the modification period needs to meet that a system frame number (SFN) mod m=0, where m is a quantity of system frames forming a modification period. A value of m is 64, 128, 256, 512, 1024, or the like. Therefore, after obtaining a system modification period, the terminal obtains the signal period, so that signaling overheads of sending the signal period configuration by the network device to the terminal is reduced, and power consumption of receiving signaling by the terminal is also reduced.

For example, one signal period includes P frames, where P is a positive integer. The P frames in a frame period is distinguished based on system frame numbers 0 to P. A length of the P frames is a length of the signal period, a length of one frame is 10 milliseconds (ms), and the length of the signal period is P*10 milliseconds. A start frame number of each signal period satisfies SFN mod P=0. mod represents a modulo or remainder operation, and SFN represents a system frame number. In this way, a frame whose system frame number is 0, P, 2P, 3P, 4P . . . is a start frame of the signal period, and a start moment of a frame whose system frame number is 0, P, 2P, 3P, 4P . . . is a start moment of each signal period. In response to P=512, a start moment of a frame whose system frame number is 0, 512, 512 . . . is a start moment of the signal period.

For another example, the length of the signal period is a length of five subframes, and a start subframe number of the signal period satisfies SUFN mod 5=0. SUFN indicates a subframe number. In this case, subframes whose subframe numbers are 0, 5, 10, 15, . . . , are start subframes of each signal period. Start moments whose subframe numbers are 0, 5, 10, 15, . . . , are start moments of each signal period. The length of the signal period is a length of five subframes (that is, five milliseconds).

The length of the signal period is agreed on in a protocol or configured by using signaling, or a start point of each signal period is agreed on in a protocol or configured by using signaling.

(2) Period:

The period is a duration distributed at an equal interval on a time axis. For example, the period is 1 minute, 1 second (s), 2 seconds, 500 ms, 250 ms, or 200 ms continuously distributed on the time axis. A start time (time_referencepoint) of each period meets that time_referencepoint mod 2 is 0 (unit: second). This indicates that start moments of a second, a fourth second, and a sixth second in each minute is a start moment of the period. Alternatively, time_referencepoint mod 1=0 (unit: second, T_period=1 second) indicates that a start moment of a first second, the second second, a third second, and the like in each minute is the start moment of the period. Alternatively, time_referencepoint mod 500=1 (unit: millisecond) indicates that a start moment of a first millisecond and a $501^{st}$ millisecond in each second is the start moment of the period.

In at least one embodiment, the millisecond is represented by ms, and the second is represented by s.

The length of the period is agreed on in a protocol or configured by using signaling, or a start moment of each period is agreed on in a protocol or configured by using signaling. This is more flexible. In at least one embodiment, the length of the period and the start moment of each period are agreed on in a communication protocol.

In at least one embodiment, an example in which the period is 1 s is used for description. In at least one embodiment, the length of the period is greater than the length of the signal period, or the length of the period is less than the length of the signal period, or the length of the period is equal to the length of the signal period.

In at least one embodiment, the network device is a gateway station in a transparent transmission mode or a satellite in a regeneration mode.

Figure 4:
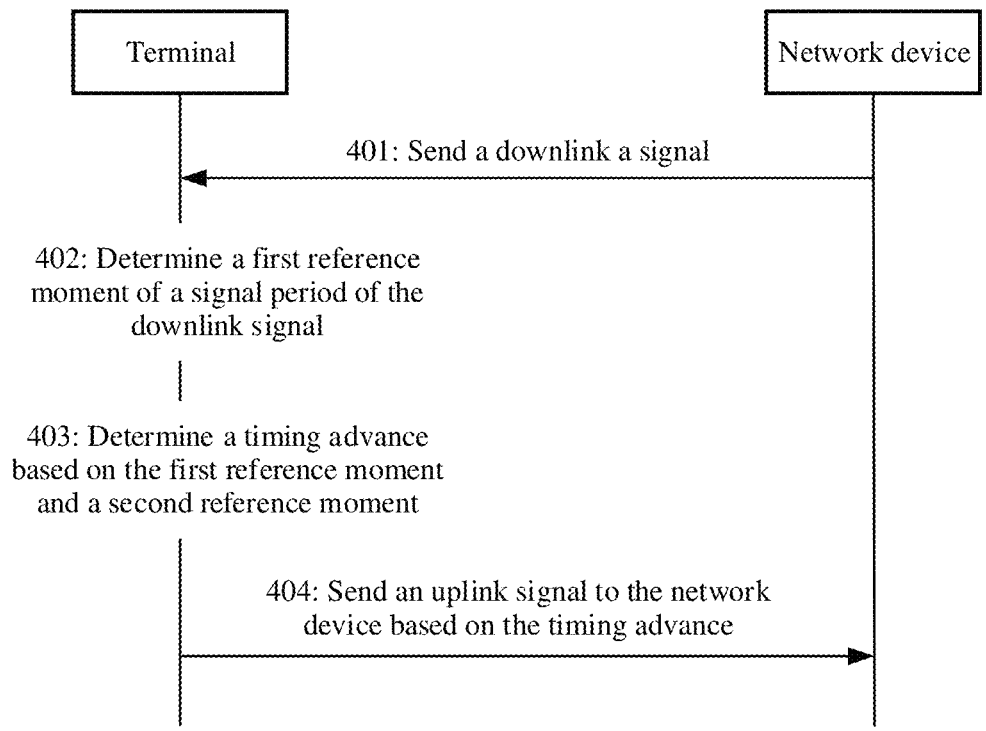
FIG. 4 is a schematic flowchart of a method for determining a timing advance according to at least one embodiment.

As shown in FIG. 4, a procedure of a first method for determining a timing advance according to at least one embodiment is described as follows.

S401: A network device sends a downlink signal to a terminal, and the terminal receives the downlink signal from the network device.

S402: The terminal determines a first reference moment of a signal period of the downlink signal.

Optionally, the first reference moment is a start receiving moment of receiving the signal period. Due to a signal transmission delay, for the network device and the terminal, a same signal period has a specific offset on a time axis. A start moment of the signal period determined by the terminal based on the received downlink signal is different from a start moment of a signal period in response to the network device sending the downlink signal. For differentiation, the start moment of the signal period determined by the terminal based on the received downlink signal is denoted as a start receiving moment. The start moment of the signal period in response to the network device sending the downlink signal is denoted as a start sending moment.

In response to receiving the downlink signal, the terminal determines the first reference moment based on the time at which the downlink signal is received. For example, the first reference moment is a start moment of the signal period. The signal period is a frame period. In response to receiving the downlink signal, the terminal determines that the downlink signal is located in a start frame of the signal period, and determines, based on a moment at which the downlink signal is received, that a start moment of the frame in which the downlink signal is located is the start moment of the signal period. Alternatively, In response to the terminal determining that the downlink signal is located in a frame in which a system frame number n in the signal period, and n is greater than or equal to 0, the terminal deduces a start moment of a start frame of the signal period based on a start moment of the system frame number n, that is, obtains a time at which the start moment of the signal period is received.

S403: The terminal determines a timing advance based on the first reference moment and a second reference moment.

Optionally, the second reference moment is a start sending moment of the signal period.

S404: The terminal sends an uplink signal to the network device based on the timing advance.

The timing advance is determined in the following manner.

Compared with the downlink timing reference, the timing advance (TA_value) is round-trip time (RTT). The RTT is a difference multiplied by 2, and the difference is a difference between a first reference moment t1 and a second reference moment t0. In other words, TA_value=2×(t1−t0). For example, the difference is a difference between the start receiving moment and the start sending moment.

Alternatively, the timing advance is a sum or a difference between the RTT and an adjustment value, and the adjustment value (T_adju) is related to a signal processing time and/or a relative motion between the network device and the terminal. In other words, TA_value=RTT+T_adju, and T_adju is a positive value, a negative value, or zero.

The timing advance TA_value value calculated by the terminal is not an integer multiple of a TA adjustment time unit. The TA_value used by the terminal=⌊RTT/time_unit⌋*time_unit, or TA_value=[(RTT+T_adju)/time_unit]*time_unit, or TA_value=(⌊RTT/time_unit⌋+T_adju)*time_unit, or TA_value=⌊RTT/time_unit⌋*time_unit+T_adju. ⌊.⌋ indicates rounding down, and time_unit indicates a time unit. For example, time_unit=16*64/2u/($\Delta f*N_f$), where u is related to a subcarrier spacing, and the subcarrier spacing is 2u*15 KHz. $\Delta f$=480*10$^3$ Hz, $N_f$=4096.

In the foregoing formula, rounding down ⌊.⌋ is used. Similarly, rounding up ⌈.⌉ is used instead of rounding down to obtain the TA value.

The following describes an optional method for determining the timing advance by the terminal based on the first reference moment and the second reference moment. For example, the first reference moment is the start receiving moment of the signal period, and the second reference moment is the start sending moment of the signal period.

The terminal determines the start sending moment of the signal period based on a first time interval, and then determine the timing advance based on the start sending moment and the start receiving moment.

The first time interval is a time interval between the start receiving moment and a start moment of a first period. The first period is a period in durations distributed at equal intervals on a time axis, and the start receiving moment is located in the first period. For example, the period is 1 s, and each second on the time axis is a period. The first time interval is an interval between the start receiving moment and a start moment of a second in which the start receiving moment is located. The start receiving moment is 14.04 seconds, the first time interval is an interval between 14.04 seconds and 14.00 seconds, that is, 0.04 seconds.

The start sending moment and the start receiving moment is located in a same period, or is located in different periods. In response to the terminal knowing whether the start sending moment and the start receiving moment are in a same period, the terminal calculates the start sending moment based on the start receiving moment and a period.

the start sending moment is within a second period, the second period is a period in durations distributed at equal intervals on a time axis. The terminal determines whether the start receiving moment and the start sending moment are in a same period, and determine the start sending moment based on an obtained determining result.

There are several optional manners for determining whether the start receiving moment and the start sending moment are in the same period.

An Optional Manner 1:

The network device sends information about a second time interval to the terminal, where the second time interval is a time interval between the start sending moment and the start moment of the second period.

The terminal determines the start sending moment of the signal period based on a value relationship between the first time interval and the second time interval.

In response to the first time interval not being less than the second time interval, the start receiving moment and the start sending moment are in a same period, and the second period and the first period are a same period. In this case, the start sending moment is obtained by postponing the start moment of the first period by the second time interval. For example, in response to the period being one second, the start receiving moment and the start sending moment are within a same second.

In response to the first time interval being less than the second time interval, the start receiving moment and start sending moment are not in a same period, and the first period is a period following the second period. In this case, the start sending moment is a moment obtained by advancing the start moment of the second time interval by the second period. The start moment of the second period is obtained by advancing the start moment of the first period by the first period. For example, in response to the period being one second, the start sending moment is within one second before the start receiving moment. In response to knowing that the start receiving moment is within a second, a second in which the start sending moment is deduced, and based on the second time interval notified by the network device, the start sending moment is obtained by postponing the second time interval.

Based on a value relationship between the first time interval and the second time interval, a determination is made whether the start receiving moment and the start sending moment are in the same period. This method is applicable to a case in which the period is greater than a maximum one-way delay. The following optional manner 2 is not only applicable to a case in which the period is greater than the maximum one-way delay, but also applicable to a case in which the period is less than or equal to the maximum one-way delay. The network device notifies the terminal of the period in which the start sending moment is located.

Another Optional Manner 2:

The network device sends first indication information to the terminal, and the terminal receives the first indication information from the network device. The first indication information indicates a period in which the start sending moment is located, that is, the second period. Alternatively, the first indication information indicates an attribute of a duration sequence number of the second period on a time axis. This attribute includes an odd number, an even numbers, or a multiple of a specified number. For example, in response a duration sequence number num meeting num mod 2=0, an even number is indicated; in response to the duration sequence number num meeting num mod 2=1, an odd number is indicated; and in response to the duration sequence number num meeting num mod 3=0, a multiple of 3 is indicated. In this way, a period in which the sending start moment is located is represented. The terminal determines, based on the first indication information, whether attributes of duration sequence numbers of the first period and the second period on the time axis are the same. In response to the attributes of the duration sequence numbers of the first period and the second period on the time axis being the same, the terminal determines that the start receiving moment and the start sending moment are in the same period, and the second period and the first period are a same period. In response to the attributes of the duration sequence numbers of the first period and the second period on the time axis not being the same, the terminal determines that the start receiving moment and the start sending moment are not in the same period, and the first period is a period following the second period.

For example, the period is one second, and the first indication information indicates whether the second period is an odd second or an even second. In response to the terminal knowing whether the first period in which the start receiving moment is located is an odd second or an even second, the terminal determines whether an attribute of the first period is the same as an attribute of the second period. In response to the first period and the second period being odd seconds or even seconds, ti indicates that the two periods are the same. In response to the first indication information indicating an odd number, but the second period is an even second, or the first indication information indicates an even number, but the second period is an odd second, the first period and the second period is not in a same second.

The network device indicates, to the terminal by using the first indication information, a second in which the start sending moment is located. Optionally, one bit is used to indicate whether the second in which the start sending moment is located is an odd number or an even number. In response to a value of 1 bit in the first indication information being 0, the second in which the start sending moment is located meets T_sec mod 2=0, that is, the start sending moment is in seconds 2, 4, 6, 8, 10, 12, and the like in each minute. In response to the value of the 1 bit being 1, the second in which the start sending moment is located meets T_sec mod 2=1, that is, the start sending moment is in seconds 1, 3, 5, 7, 9, 11, and the like in each minute.

In the foregoing optional manner 1, the network device sends the information about the second time interval to the terminal. The following describes the information about the second time interval.

The information about the second time interval indicates a time value of the second time interval, or indicates a quantity. The quantity indicates a quantity of time units or a quantity of unit time included in the second time interval. One period is divided into a plurality of equal-length time units or unit time. The terminal calculates the second time interval based on the quantity.

In response to the information about the second time interval being the time value of the second time interval, an example representation relationship is shown in Table 1.

TABLE 1

| | Signaling | | | | | | | | | | | | |
|---|---|---|---|---|---|---|---|---|---|---|---|---|---|
| | 00000 | 00001 | 00010 | 00011 | 00100 | 00101 | 00110 | 00111 | 01000 | 01001 | 01010 | 01011 | 01100 |
| Δt (s) | 0 | 0.04 | 0.08 | 0.12 | 0.16 | 0.2 | 0.24 | 0.28 | 0.32 | 0.36 | 0.4 | 0.44 | 0.48 |
| | 01101 | 01110 | 01111 | 10000 | 10001 | 10010 | 10011 | 10100 | 10101 | 10110 | 10111 | 11000 | |
| Δt (s) | 0.52 | 0.56 | 0.6 | 0.64 | 0.68 | 0.72 | 0.76 | 0.8 | 0.84 | 0.88 | 0.92 | 0.96 | |

Table 1 shows a correspondence between the information about the second time interval and the time value. The information about the second time interval is represented by signaling, and the time value of the second time interval is represented by Δt. For example, the period is one second, and five bits are used to represent 25 second time intervals in one second. For example, 00001 indicates 0.04 seconds, and 01100 indicates 0.48 seconds.

For example, as shown in Table 2, the period is 500 ms, that is, 0.5 s. Five bits is used to represent 25 second time intervals within 0.5 s. For example, 00001 indicates 0.02 seconds, and 01100 indicates 0.24 seconds.

TABLE 2

| | Signaling | | | | | | | | | | | | |
|---|---|---|---|---|---|---|---|---|---|---|---|---|---|
| | 00000 | 00001 | 00010 | 00011 | 00100 | 00101 | 00110 | 00111 | 01000 | 01001 | 01010 | 01011 | 01100 |
| Δt (s) | 0 | 0.02 | 0.04 | 0.06 | 0.08 | 0.10 | 0.12 | 0.14 | 0.16 | 0.18 | 0.20 | 0.22 | 0.24 |
| | 01101 | 01110 | 01111 | 10000 | 10001 | 10010 | 10011 | 10100 | 10101 | 10110 | 10111 | 11000 | |
| Δt (s) | 0.26 | 0.28 | 0.30 | 0.32 | 0.34 | 0.36 | 0.38 | 0.40 | 0.42 | 0.44 | 0.46 | 0.48 | |

Figure 5:
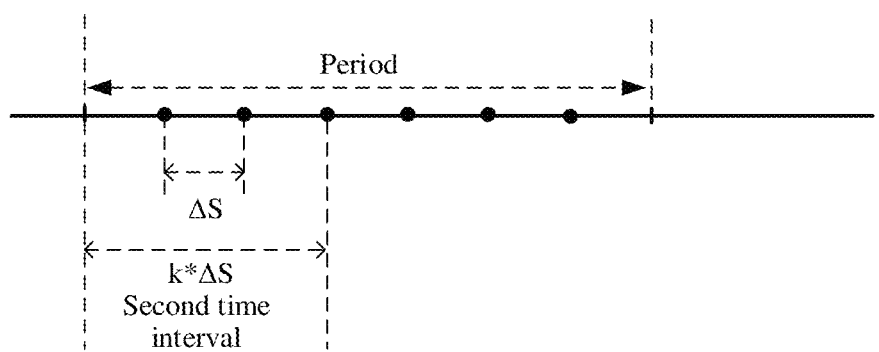
FIG. 5 is a schematic diagram in which a period is divided into equal long time units according to at least one embodiment.

In response to the information about the second time interval indicating a quantity or a parameter, the terminal calculates the second time interval based on the parameter or the quantity. As shown in FIG. 5, a period is divided into time units of equal intervals. The second time interval is represented by Δt. The period is divided into K ΔS. In response to Δt=K*ΔS, the network device indicates a parameter K or a value K. The terminal calculates the second time interval based on Δt=K*ΔS. In response to the period being 1 second, an interval of 1 second is divided into K ΔS intervals, that is, K*ΔS=1 second. Assuming that ΔS=100 μs, one second is divided into 1 s/100 μs=10000 ΔS, that is, K=10000. The network device needs 14 bits to represent the parameter K, and sends the parameter K to the terminal. For example, in response to the second time interval being 0.92 seconds and ΔS=100 μs, the parameter K is 9200, and 14 bits 10001111110000 represent 9200.

Optionally, in response to the network device not directly indicating the second time interval, the terminal further determines the second time interval in the following manner.

An interval between the start sending moment and the start moment of the period is the second time interval, and the second time interval is greater than or equal to 0. In response to the second time interval being greater than 0, in response to a signal period being advanced on the time axis, a start sending moment of a signal period is aligned with a start moment of a period. The signal period is referred to as a reference signal period, and the period is denoted as a third period. In at least one embodiment, due to various external factors, a difference between a start sending moment of the reference signal period and the start moment of the period is a fixed value, which is denoted as a first fixed value. The first fixed value is any value greater than 0, less than 0, or equal to 0.

The network device sends second indication information to the terminal, where the second indication information indicates a reference signal period. For example, the second indication information is represented as a signal-period alignment indication (sig_time_align). The second indication information indicates a nonnegative integer, indicate a distance between a current signal period for sending a downlink signal and the reference signal period, and indicate a difference of several signal periods. For example, the second indication information indicates 3, indicating that there is a difference of three signal periods between the start moment of the current signal period for sending the downlink signal and a start moment of the reference signal period. In response to the second indication information indicating 0, the current signal period for sending the downlink signal is the reference signal period, and a start moment of the current signal period for sending the downlink signal is aligned with or different from the start moment of the second period by a first fixed value.

Based on the second indication information or signaling sig_time_align, the start moment of the signal period, the length of the second period, and the start moment of the second period, a second time interval Δt between a start moment of the signal period for receiving the downlink signal and the start moment of the second period is calculated. In response to the start sending moment of the reference signal period being aligned with a start moment of the third period, Δt=(sig_time_align*signal period) mod the period. For example, In response to the signal period meeting P=64, a start frame is a frame whose system frame number is 0, 64, 128, 192, or the like. The period is 1 second, and the start moment (time_referencepoint) of the second period meets: time_referencepoint mod 1=0 (unit: second).

The terminal receives signaling sig_time_align=3. In this case, Δt=(3*0.64)mod 1=0.92 seconds. In this case, the second indication information or the signaling sig_time_align needs five bits to represent 0 to 25.

The start sending moment of the reference signal period is aligned with or differs from the start moment of the third period by the first fixed value. The first fixed value is greater than 0, less than 0, or equal to 0. In response to the first fixed value being equal to 0, the start sending moment of the reference signal period is aligned with the start moment of the third period. The start sending moment of the reference signal period is aligned with the start moment of the third period. In response to the first fixed value being greater than 0, the start sending moment of the reference signal period is in the third period. Alternatively, In response to the first fixed value being less than 0, the start sending moment of the reference signal period is in a period previous to the third period.

The terminal determines the second time interval based on a time distance between the start receiving moment of the signal period of the downlink signal and the start receiving moment of the reference signal period. The second time interval is a value obtained by adding the time distance and the first fixed value and performing a modulo operation on one period.

The foregoing description uses an example in which the first reference moment is the start receiving moment of the signal period, and the second reference moment is the start sending moment of the signal period. Optionally, the second reference moment and/or the second reference moment is any moment specified in the signal period. For example, the second reference moment is specified as a start sending moment of a second system frame in the signal period. The second time interval is a time interval between the second reference moment and a start moment of a period in which the second reference moment is located. Similarly, in response to the first time interval or the second time interval being calculated, a start moment of a period is used as a reference point for calculation. Optionally, the time interval is calculated by using any moment in the period as a reference point. For example, a location 0.1 s away from a start moment in each period is used as the reference point. Certainly, reference points of periods selected for the first time interval and the second time interval is a same moment.

In this way, the second time interval is a time interval between the second reference moment and a specified reference point of the period in which the second reference moment is located.

In this case, a related solution of the foregoing start sending moment alternatively isi any specified moment in the signal period. The foregoing solution of the start moment of the period alternatively is any reference point specified in the period. The terminal is notified of specified reference points of the first reference moment, the second reference moment, and the period by using a protocol specification or a signaling notification manner.

In at least one embodiment, a plurality of moments and periods are involved, and a time standard is needed for both the network device and the terminal. Optionally, coordinated universal time (UTC) is used as a reference moment. In response to the terminal and the network device implementing time synchronization, another time is used to replace the UTC time as the reference moment. For example, Beijing time, Pacific standard time, Newfoundland standard time, time measured in binary, or, time measured in octal is used as the reference moment.

To better understand the first method for determining a timing advance and some of the foregoing optional implementations provided in at least one embodiment according to at least one embodiment, the following uses an example in which the signal period is a modification period of the system information.

In the following FIG. 6 to FIG. 9, one signal period represents a period in which the system updates system information. A start frame of each signal period meets that SFN mod P=0. SFN is a system frame number. P is a quantity of system frames included in one signal period. For example, a value of P is 64, 128, 256, 512, or the like. A signal period includes P frames, and a frame whose system frame number is 0, P, 2P, 3P, 4P . . . is a start frame of a signal period. A start moment of the start frame is a start moment of the signal period. A start moment of a corresponding signal period in which a network device sends a downlink signal is a start sending moment. A start moment of a signal period in which a terminal receives the downlink signal is a start receiving moment. Durations distributed at equal intervals on a time axis form a plurality of periods. For example, the period is 1 second.

In response to obtaining a modification period of the system information, the terminal obtains the signal period. A definition or signaling is no needed for notifying the signal period. The period is notified to the terminal in a manner specified in a protocol or notified by using the signaling.

Figure 6:
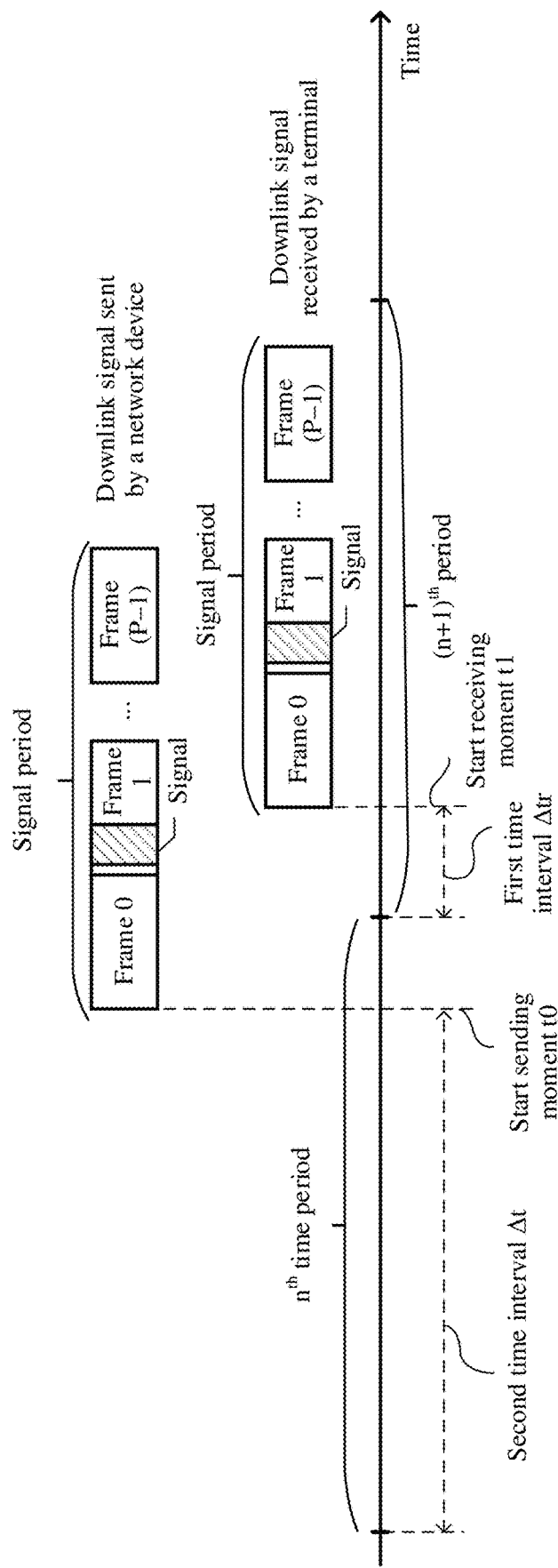
FIG. 6 is a schematic diagram of a method for determining a timing advance in a scenario according to at least one embodiment.

As shown in FIG. 6, the signal period includes P frames whose frame numbers are 0 to (P−1). A start receiving moment t1 is a first reference moment, and a start sending moment t0 is a second reference moment. t1 and t0 are absolute times on the time axis, and is UTC time, or is other types of time based on time synchronization between the terminal and the network device. An interval between the start receiving moment t1 and a start moment of a period in which the start receiving moment t1 is located is a first time interval Δtr. An interval between the start sending moment t0 and a start moment of a period in which the start sending moment t0 is located is a second time interval Δt.

The network device starts to send a signal period of a frame 0 to a frame (P−1) at t0. The terminal receives a downlink signal in the signal period. The terminal receives the downlink signal at a start frame of the signal period, or receives the downlink signal in a frame after the start frame of the signal period. Regardless of which frame of the signal period the terminal receives the downlink signal, the terminal determines the start moment of the start frame of the signal period based on information about a frame number (and/or a subframe number) of a currently received downlink signal.

For example, in FIG. 6, in response to the terminal receiving a downlink signal in a frame whose system frame number is 1, and a start moment at which the downlink signal is received is 14.3 seconds, a length between the start frame and the frame 1 is a length of one frame, that is, 0.01 seconds, the start moment of the start frame of the signal period is 14.29 seconds, and the start receiving moment t1 is 14.29 seconds. The first time interval is a length from the start receiving moment to the start moment of the period including the start receiving moment, that is, a length from 14.29 seconds to the start moment 14.00 seconds in which a start receiving moment is located. the first time interval Δtr=0.29 seconds.

The network device determines Δt based on the start sending moment t0 of the signal period for sending the downlink signal. For example, in response to t0=14.04 seconds, a second time interval between t0 and the start moment 14.00 seconds in which t0 is located is Δt=14.04−14.00=0.04 seconds.

Information about the second time interval Δt needs to be notified by the network device to the terminal. The terminal determines, based on a value relationship between Δt and Δtr, whether t1 and t0 are in a same second.

In response to Δtr<Δt, the terminal determines that the network device sends a start frame of the signal period starting from a previous second. The terminal receives, in a current second, the start frame of the signal period sent by the network device in the previous second. The start receiving moment is 14.29 seconds, Δtr=0.29 seconds, and Δt=0.38 seconds, the terminal determines that the start sending moment is within a $13^{th}$ second. Based on Δt=0.38 seconds, the terminal obtains that the start sending moment t0=13.00+0.38=13.38 seconds.

In response to Δtr≥Δt, the terminal determines that sending the downlink signal by the network device and receiving the downlink signal by the terminal are within a same second.

For example, In response to Δtr=0.29 seconds and Δt=0.04 seconds, Δtr>Δt. The terminal determines that the start sending moment and the start receiving moment are within a same second. In response to the start receiving moment being 14.29 seconds, the start sending moment is also within a $14^{th}$ second. Based on Δt=0.04 seconds, the start sending moment t0=14.00+0.04=14.04 seconds. Further, the terminal calculates round-trip time based on RTT=2*(t1−t0). RTT=2*(t1−t0)=2*(14.29−14.04)=0.50 seconds. A timing advance (TA_value) is equal to the RTT, and TA_valu=RTT=0.50 seconds. Alternatively, the TA is obtained based on the RTT in combination with an adjustment value T_adju, that is, TA_value=RTT+T_adju. The T_adju is related to factors such as a signal processing time and relative movement between the network device and the terminal, and is a positive value, a negative value, or zero.

FIG. 6 is shown by using an example in which Δtr<Δt. The start sending moment is within an $n^{th}$ period, and the start receiving moment is within an $(n+1)^{th}$ period.

With reference to the method shown in FIG. 6, specific values are assigned to the start sending moment, the start receiving moment, the first time interval, and the second time interval for description.

Figure 7:
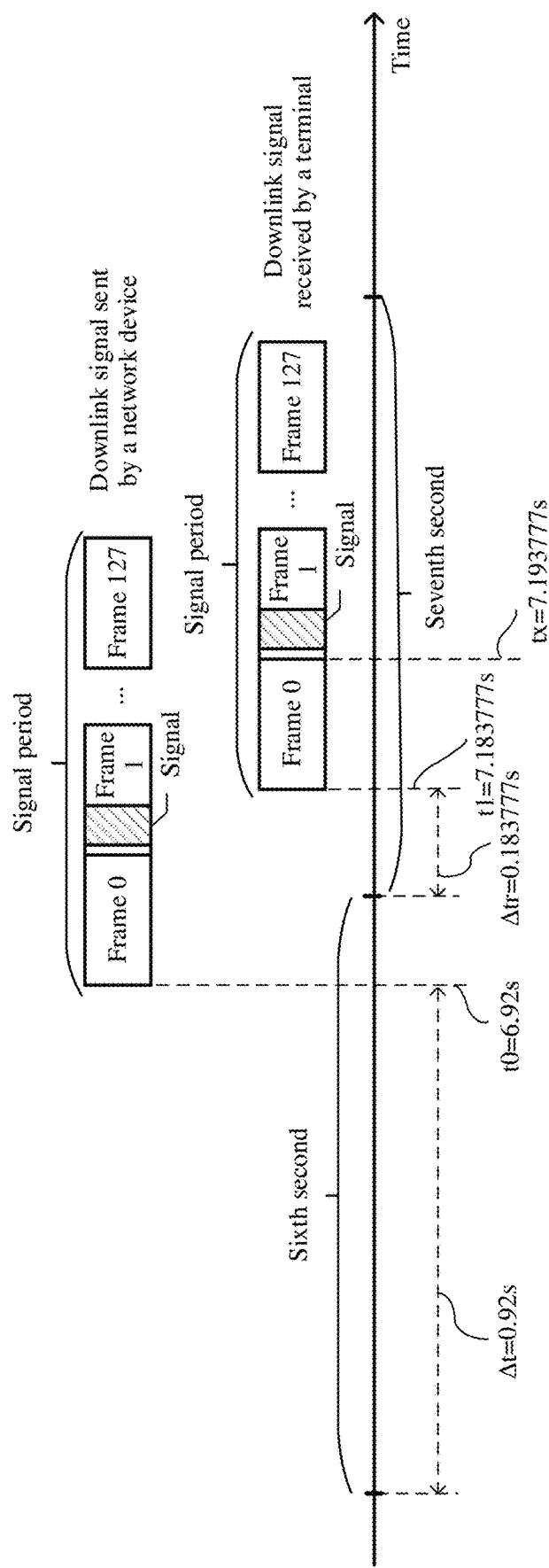
FIG. 7 is a schematic diagram of an example of a method for determining a timing advance in a scenario according to at least one embodiment.

As shown in FIG. 7, one signal period is a modification period of system information, and includes 128 frames, that is, P=128. The network device starts to send a start frame of a signal period in a $6^{th}$ second. A time interval between a start moment of the start frame and a start moment of one second in which the start frame is located is Δt=0.92 seconds. UTC time of a start moment of a modification period of a broadcast signal sent by the network device is t0=6.92 seconds. UTC time of a start time of a frame in which the downlink signal received by the terminal is located is tx=7.193777 seconds, and a frame number is 1. An interval between a frame whose number is 1 and the start frame is the length of one frame, that is, 0.01 seconds. UTC time in response to the terminal receiving the start moment of the modification period is t1=tx−0.01=7.183777 seconds. A time interval between the start receiving moment of the modification period received by the terminal and the start moment of 1 second is Δtr=0.183777 seconds.

In a broadcast signal, signaling of 5 bits is used to indicate the time interval Δt between the start sending moment of the modification period and a start moment of is within the is where the modification period is located. For example, as shown in Table 1, in response to Δt=0.92 seconds, 10111 is used to represent Δt.

The terminal determines, based on a value relationship between Δt and Δtr, a second at which the network device starts to send the start frame of the modification period. Because Δtr<Δt, the network device starts to send the start frame of the modification period within 1 second before the terminal receives the start moment of the modification period.

The terminal obtains, based on the second at which the network device starts to send the modification period start frame and the time interval Δt, the start sending moment t0=6+0.92=6.92 seconds at which the network device sends the start frame of the modification period. Therefore, round-trip time RTT=2*(t1−t0)=2*(7.183777-6.92)=0.527554 seconds is obtained through calculation, and is used as a TA value.

Optionally, in response to a TA being used to adjust a time unit to represent the used TA value, TA_value=⌊RTT/time_unit⌋*time_unit=⌊0.527554/(16*64/(480*103*4096))⌋*(16*64/(480*103*4096))≈0.52755364583 seconds. Herein, a subcarrier spacing is 15 kHz.

Figure 8:
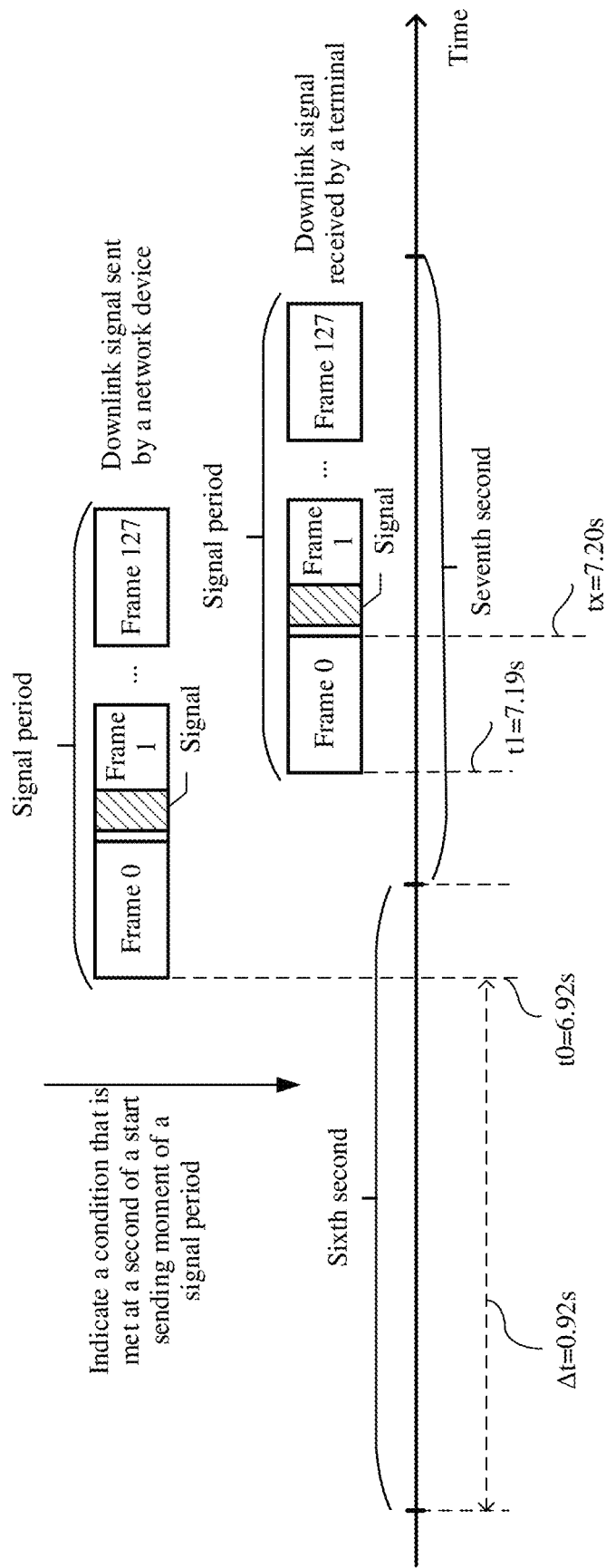
FIG. 8 is a schematic diagram of a method for determining a timing advance in another scenario according to at least one embodiment.

As shown in FIG. 8, a specific value is assigned to each quantity in the foregoing optional manner 2 for description.

One signal period is a modification period of system information, and includes 128 frames, that is, P=128. The network device starts to send a start frame of a signal period in a $6^{th}$ second. A time interval between a start moment of the start frame and a start moment of one second in which the start frame is located is Δt=0.92 seconds. UTC time of a start moment of a modification period of a broadcast signal sent by the network device is t0=6.92 seconds. UTC time of a start time of a frame in which the downlink signal received by the terminal is located is tx=7.20 seconds, and a frame number is 1. An interval between a frame whose number is 1 and the start frame is the length of one frame, that is, 0.01 seconds. UTC time in response to the terminal receiving the start moment of the modification period is t1=tx−0.01=7.19 seconds. A time interval between the start receiving moment of the modification period received by the terminal and the start moment of 1 second is Δtr=0.19 seconds.

In a broadcast signal, signaling of 5 bits is used to indicate the time interval Δt between the start sending moment of the modification period and a start moment of is within the is where the modification period is located. For example, as shown in Table 1, in response to Δt=0.92 seconds, 10111 being used to represent Δt.

In a broadcast signal, 1 bit is used to indicate, to the terminal, a condition that is met at the second of the start moment of the modification period sent by the network device. For example, T_sec mod 2=1 or T_sec mod 2=0 is met. As shown in FIG. 8, signaling of 1 bit sent by the network device to the terminal is 0, indicating that the second in which the start moment of the modification period is located meets T_sec mod 2=0. In other words, the start moment of the modification period is sent in seconds 2, 4, 6, 8, 10, 12, and the like in each minute. The terminal selects a second that is closest to the second at which the start moment of the modification period is received and that meets the condition.

The terminal obtains, based on a start moment t2=7.2 seconds and a modification period P=128 of the frame in which the signal is received, a moment t1=7.19 seconds at which the start moment of the modification period is received. The terminal determines, based on a condition that is met at a second of the start moment of the modification period sent by the network device and that a sixth second that meets the condition is closest to t1=7.19 seconds, the start moment of the modification period sent by the network device at the sixth second. Further, the time t0=6.92 seconds at the start moment of the modification period at which the network device sends the broadcast signal is obtained according to the distance Δt from the start moment of 1 second. Therefore, round-trip time RTT=2*(t1−t0)=2*(7.19−6.92)=0.54 s is calculated, and is used as a TA value for sending an uplink signal.

In this case, the terminal does not need to calculate a value of Δtr, but determines, based on the condition that is met by a second in which the start sending moment is located and that is indicated by the network device, a second in which the start sending moment is located. An arrow indicating, by the network device shown in FIG. 8, a condition met by a second in which the start sending moment is located does not represent a time domain location, and is sent at any moment.

The network device also indicates, to the terminal by using signaling, 500 milliseconds in which the start moment of the signal period or the modification period is located. For example, signaling of 1 bit is used to indicate that the start sending moment is a first half 500 milliseconds or a second half 500 milliseconds in each second.

As mentioned above, in response to the network device not directly indicating the second time interval, the terminal further determines the second time interval by using second indication information sent by the network device. The second indication information indicates a reference signal period. The following further describes this optional solution by using an example shown in FIG. 9.

Figure 9:
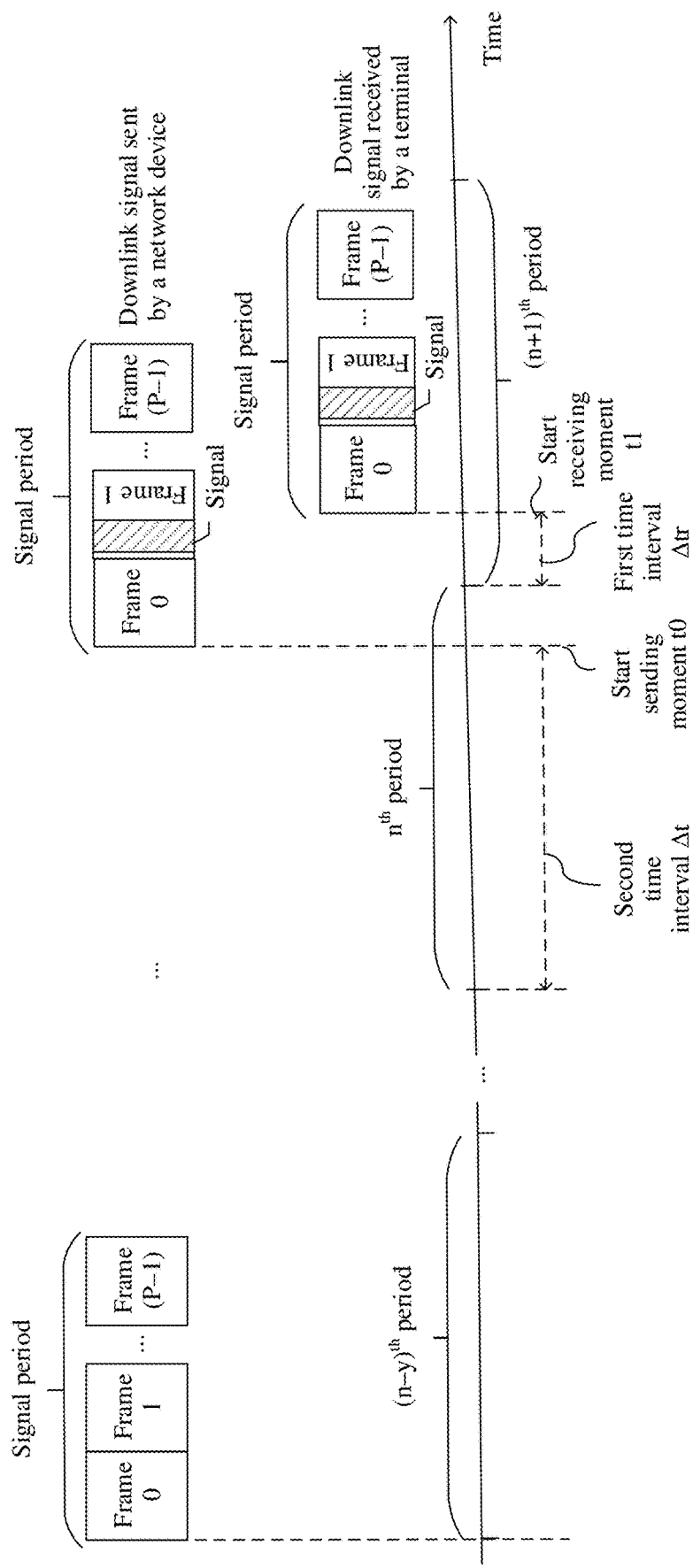
FIG. 9 is a schematic diagram of a method for determining a timing advance in still another scenario according to at least one embodiment.

As shown in FIG. 9, the signal period includes P frames whose frame numbers are 0 to (P−1). A start receiving moment t1 is a first reference moment, and a start sending moment t0 is a second reference moment. t1 and t0 are absolute times on the time axis, and is UTC time, or is other types of time based on time synchronization between the terminal and the network device. An interval between the start receiving moment t1 and a start moment of a period in which the start receiving moment t1 is located is a first time interval Δtr. An interval between the start sending moment t0 and a start moment of a period in which the start sending moment t0 is located is a second time interval Δt. The network device does not directly indicate the information about the second time interval to the terminal, but sends the second indication information to the terminal, to indicate the reference signal period. As shown in FIG. 9, before the signal period, there is a reference signal period. A start sending moment of a start frame of the reference signal period is aligned with a start moment of an $(n-y)^{th}$ period. y is a non-negative integer. Certainly, a difference between the start sending moment of the start frame of the reference signal period and the start moment of the period is a fixed value. For example, in FIG. 9, the start sending moment of the start frame of the reference signal period is aligned with the start moment of the duration.

So far, a relationship between the signal period and the period is not limited in the foregoing embodiments. The terminal needs to determine a period in which the second reference moment is located, to determine a specific value of the second reference moment, and further determine the timing advance based on the first reference moment and the second reference moment. In at least one embodiment, another optional manner is provided to determine a specific value of a second reference moment. Details are as follows:

The length of the period is M times the length of the signal period. M is a value greater than 0 In response to M=1, the length of the period is the same as the length of the signal period. M is a value greater than 1, and the length of the period is greater than the length of the signal period. Alternatively, M is a value less than 1, and the length of the period is less than the length of the signal period.

In addition, the second reference moment is aligned with or differs from a start moment of the period by a second fixed value. The second fixed value is a value greater than 0, less than 0, or equal to 0. In other words, the second reference moment is at a position after or before the start moment of the period or at an aligned position. In the description of this paragraph, "the start moment of the period" is replaced with "any specified time of the period". For a definition of the second reference moment, refer to the foregoing description of the definition of the second reference moment.

M=1, and the length of the period is the same as the length of the signal period, after determining the first reference moment in S402, the terminal determines, based on the first reference moment, the start moment of the first period in which the first reference moment is located. The terminal determines, based on the start moment of the first period and the second fixed value, the start sending moment of the signal period.

M>1, that is, the period is M times the signal period. After determining the first reference moment, the terminal determines which 1/M of the first period the first reference moment is in, to determine the start moment of the first period. The terminal determines the start sending moment of the signal period based on the start moment of the first period, a $1/M^{th}$ 1/M of the first reference moment, and the second fixed value.

In response to the first reference moment being within a $z^{th}$ signal period in the first period (that is, the first reference moment is within a $z^{th}$ 1/M time length in the first period), based on the second fixed value, the start sending moment of the signal period is determined by postponing or advancing the start moment of the first period by [z*signal period length+second fixed value]. z is a positive integer.

M<1, the period is less than the signal period, and one signal period is divided into a plurality of periods. After receiving the downlink signal, the terminal determines a moment of the first reference moment in the first period in which the terminal is located, and further determines the start moment of the first period. The terminal determines, based on the start moment of the first period and the second fixed value, the start sending moment of the signal period. The start sending moment of the signal period is determined by advancing or postponing the start moment of the first period by the second fixed value.

Figure 10:
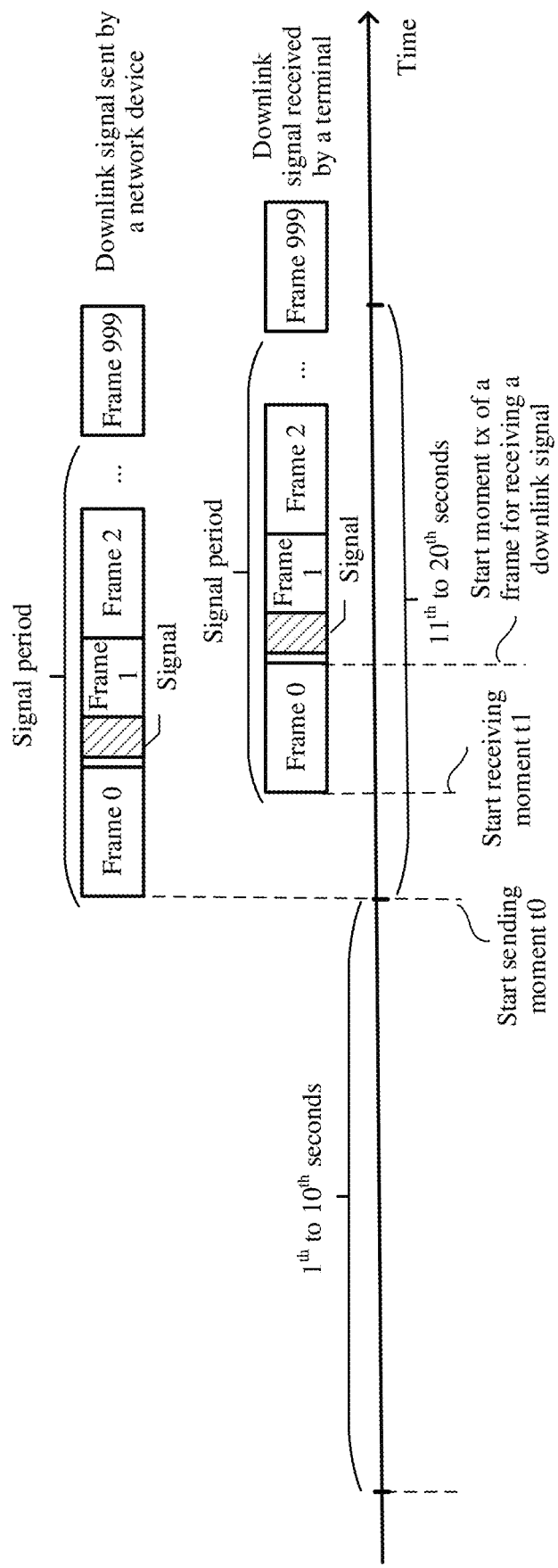
FIG. 10 is a schematic diagram of a method for determining a timing advance in yet another scenario according to at least one embodiment.

As shown in FIG. 10, the length of the period is the same as that of the signal period, and the start sending moment of the signal period is aligned with the start moment of the period. The terminal determines the start receiving moment t1 of the signal period in which the received downlink signal is located, determine t0 based on t1, and do not need to calculate the first time interval Δtr. The network device does not need to notify information about the second time interval Δt or the first indication information. Further, the timing advance is determined based on t1 and t0.

In at least one embodiment, optionally, before S401, the network device further sends indication information to the terminal, where the indication information is denoted as third indication information. The terminal receives the third indication information from the network device. The third indication information indicates the length of the signal period and/or the value of M. Certainly, the length of the signal period and/or the value of M is specified by using a protocol. In response to a default length of the signal period being the same as the length of the period, the length of the signal period is notified by using signaling or specified in a protocol, and the value of M does not need to be notified or specified.

Optionally, the signal period is a positive integer multiple of 250 ms. For example, the length of the signal period is 250 ms, and the length of the period is equal to 250 ms, or the length of the period is 500 ms, 1 s, 2 s, 10 s, 20 s, or the like. In response to the length of the period being 1 s, the period is four times the signal period.

In response to the signal period being a modification period of system information, a length of the modification period is 64, 128, 256, 512, 1024, or the like. In response to a unit time being 1 s, considering that the length of the modification period is not an integer multiple of the unit time, the length of the signal period is set to an integer multiple of the unit time, and the length of the modification period is changed based om the length of the signal period. For example, the length of the signal period is defined as 10 s, and a length close to the modification period is 10.24 s. The modification period 10.24 s of the system information is changed to 10 s. For example, 1 bit is used to indicate whether the modification period is 10.24 s or 10 s. In response to a value of bit 1 being 1, the modification period is 10 s. In response to the value of bit 1 being 0, the modification period is 10.24 s. In response to the modification period being 10.24 s, a frame number in the modification period ranges from 0 to 1023. In response to the modification period being 10 s, the frame number in the modification period ranges from 0 to 999.

Optionally, in response to the signal period being equal to a system frame period, In response to the frame period being 1024, the length of the signal period is 10.24 seconds, which is not a multiple of the unit time. In response to the system frame period being 1000 or a multiple of 1000, the length of the signal period is a multiple of the unit time. The length of the frame period is configured for the terminal by using signaling. For example, 1 bit is used to indicate whether the length of the signal frame period is 1024 or 1000. Signaling consumption of indication of the length of the signal period is reduced.

In response to the signal period being 10 s, an agreed period is also 10 s, and the start sending moment of the signal period is aligned with the start moment of the period. For example, the start sending moment of the signal period is aligned with a start moment of 1 s, 11 s, 21 s, 31 s, 41 s and 51 s in each minute. In other words, the start moment of 1 s, 11 s, 21 s, 31 s, 41 s and 51 s in each minute is the second reference moment. Alternatively, the start sending moment of the signal period is aligned with start moments of a 3rd second, a $13^{th}$ second, a $23^{rd}$ second, a $33^{rd}$ second, and the like in each minute. Alternatively, a specific start second is not agreed on, and the start sending moment of the signal period is aligned with the start moment of the second in which the signal period is located. Alternatively, the terminal is notified, by using signaling, that the start sending moment of the signal period is aligned with a start moment of which second. For example, 4 bits are used to represent a number between 1 and 10, indicating that the start sending moment of the signal period is aligned with a start moment of a corresponding second.

Optionally, the start sending moment of the signal period is aligned with a start moment of one second, or aligned with 500 ms in one second. One bit is used to notify the terminal that the start moment of the signal period is aligned with the start moment of the one second or aligned with 500 ms in the one second.

Optionally, the signal period is not limited to 1024 or 1000, and is set to another value, for example, 500 or 10000.

Assuming that a start sending moment of the signal period shown in FIG. 10 is aligned with a start moment of an $11^{th}$ second within one minute, t0=11.225 seconds. A start receiving moment of the signal period in which the terminal receives the downlink signal is t1=11.225 s. RTT=2*(t1−t0)=2*(11.225−11.0)=0.45 s is used as the TA value for sending the uplink signal.

After receiving the downlink signal sent by the network device, the terminal determines the start receiving moment of the signal period of the downlink signal, where the start receiving moment is the UTC time t1. For example, a frame number of the downlink signal sent by the network device and received by the terminal is SFN=5, and a start time at which the SFN=5 frame is received is a $31.23^{rd}$ second. Therefore, the start receiving moment of the signal period in which the terminal receives the downlink signal is a start moment of SFN=0, and corresponding UTC time t1=31.23-0.05=31.18 seconds.

The terminal determines, based on a characteristic that the start sending moment of the signal period is aligned with the start moment of the period, the start sending moment t0 of the signal period=31 seconds. Further, the terminal calculates the round-trip time based on RTT=2*(t1−t0), and use the round-trip time as the TA value for sending the uplink signal.

Based on the foregoing embodiment, the following optional manners are provided.

Figure 11:
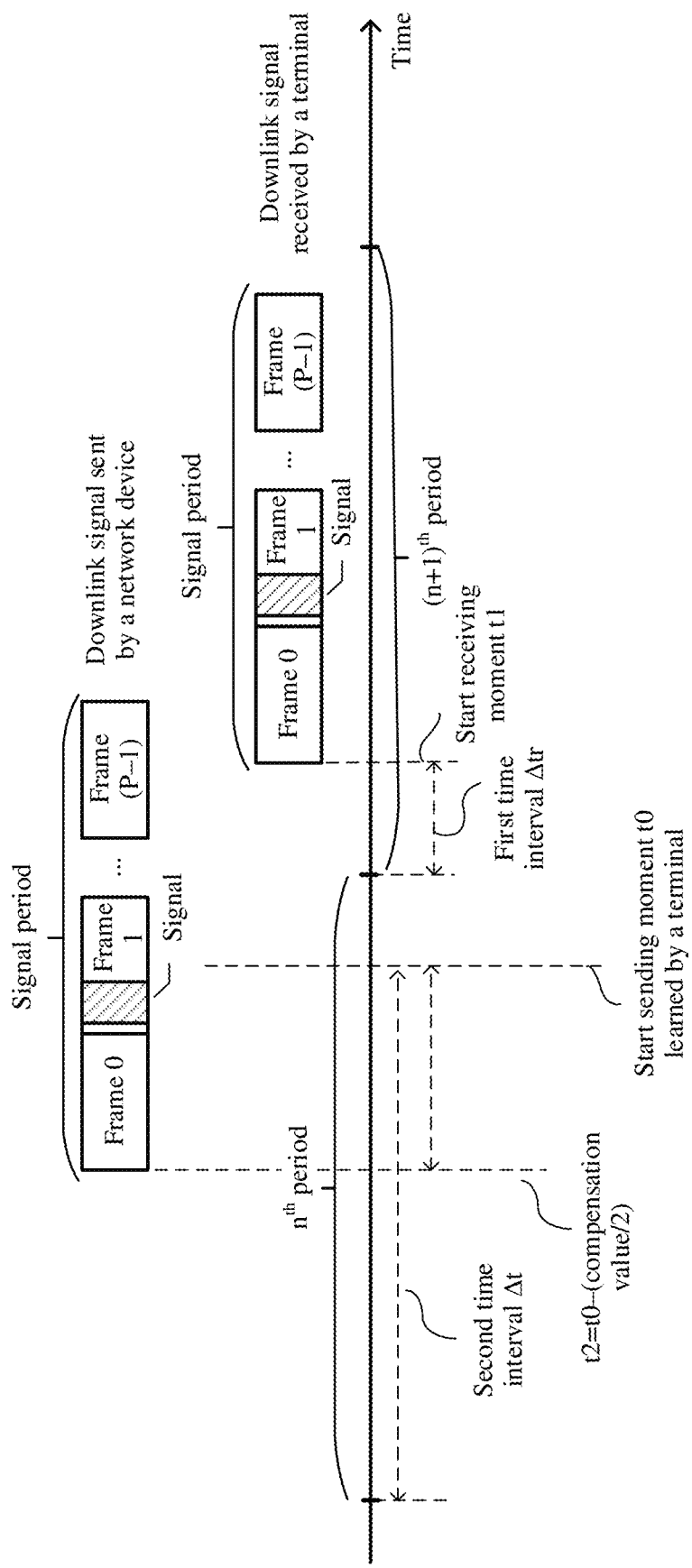
FIG. 11 is a schematic diagram of a method for determining a timing advance after delay compensation of a network device according to at least one embodiment.

In at least one embodiment, the network device sends the signal period at the moment t0. Optionally, as shown in FIG. 11, a network device performs delay compensation on a received uplink signal, and a compensation value is delay_compensated. That the network device performs delay compensation on the received uplink signal is understood as performing delay processing on a receive window of the uplink signal. In response to sending the signal period, the network device starts to send a start frame of a signal period at time t2=t0−delay_compensated/2. In other words, a start moment of the signal period is aligned with t2. However, a definition of a second time interval indicated by the network device to the terminal remains unchanged. In other words, the second time interval Δt is still calculated based on t0. In the foregoing embodiment performed by the network device, except that the start moment of the signal sending period is changed to t2, other operations remain unchanged. A method for determining the timing advance on a terminal side also remains unchanged, and is performed according to the foregoing embodiment. For example, the terminal still calculates round-trip time based on RTT=2*(t1−t0), to further determine the TA. The method is used in combination with any one of the foregoing implementations.

The TA determining method provided according to at least one embodiment is compatible with an existing TA determining method. The network device indicates, to the terminal, whether the TA determining method in at least one embodiment or another method is used. For example, the network device sends indication information to the terminal, where the indication information is 1 bit. In response to a value of the indication information being 1, the TA determining method provided according to at least one embodiment is used. The network device and the terminal implement the TA determining method according to a method provided in the foregoing embodiments. In response to a value of the indication information being 0, another TA determining method is used. Alternatively, in response to the indication information being 1, the network device sends the downlink signal according to the method provided in in at least one embodiment, and the terminal determines the TA value by using the method provided according to at least one embodiment. In response to the indication information being 0, the network device does not send the downlink signal according to the method provided in at least one embodiment, and the terminal does not determine the TA value by using the foregoing method either. Certainly, indication meanings of 1 and 0 is interchanged.

In at least one embodiment, some signals or information is used, including a downlink signal and indication information. The indication information further includes the first indication information, the second indication information, the third indication information, the information about the second time interval, and the like. Optionally, an expression form of the involved signal or information is a message or signaling in any form described below, or the involved signal or information is carried in or carried in a message in any form described below:

at least one of broadcast information of a system information block (SIB) 1, other system information (OSI), a master information block (MIB), and the like. Optionally, a change of the indication information, the information about the second time interval, and the like does not generate a system information change notification, and does not cause a change of a tag value (value Tag) in the SIB 1.

The network device performs unicast, broadcast (broadcast is performed in a cell range, a beam range, or a BWP range), or multicast sending to the terminal. In addition, in response to sending being performed in a radio resource control (RRC) connection phase, the network device carries the information in at least one type of information of RRC information, an RRC reconfiguration message, downlink control information (DCI), group DCI, a media access control (MAC) element, and timing advance command (TAC), or transmit the information with data, or carry the information in a separately allocated physical downlink shared channel (PDSCH) bearer.

In response to the terminal performs cell/beam switching, information is carried in an RRCReconfiguration message, or is carried in BWP-related signaling. For example, a cell in communication notifies a terminal of at least one piece of information such as first indication information, second indication information, third indication information, second time interval information, a signal period, and a period of a target cell (or multiple target cells) by using RRCReconfiguration signaling. For another example, in response to intra-cell beam switching being performed, at least one of the first indication information, the second indication information, the third indication information, the second time interval information, the signal period, the period, and the like of the target beam in initial BWP signaling, BWP downlink common signaling (BWP-DownlinkCommon), BWP uplink common signaling (BWP-UplinkCommon), BWP downlink dedicated signaling (BWP-DownlinkDedicated), or BWP uplink dedicated signaling (BWP-UplinkDedicated) is sent to the terminal.

During cell switching, neighboring cell measurement and switching signaling procedures are triggered. At least one piece of information of the first indication information, the second indication information, the third indication information, the second time interval information, the signal period, the period, and the like of the target cell (or the plurality of target cells) is sent to the terminal by using neighboring cell measurement configuration signaling (MeasConfig).

Different beams are distinguished in a protocol based on a bandwidth part (BWP), a transmission configuration indication (TCI), or a synchronization signal block (SSB). In other words, a beam is indicated based on the BWP, the TCI, or the SSB. For example, for the terminal and the network device, switching between beams is indicated by switching between BWPs, TCIs, or SSBs. Therefore, for the terminal and/or the network device, what is actually performed is the switching between the BWPs, TCIs, or SSBs.

In addition, the beam according to at least one embodiment is replaced with the BWP, the TCI, or the SSB.

Examples described in embodiments herein show some implementations, to help better understand and describe the method. Persons skilled in the art obtains examples of some evolved forms according to the reference signal indication method provided according to at least one embodiment.

In at least one embodiment, the method provided in at least one embodiment is separately described from perspectives of the network device, the terminal, and interaction between the network device and the terminal. To implement functions in the method provided in at least one embodiment, the network device and the terminal includes a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 12:
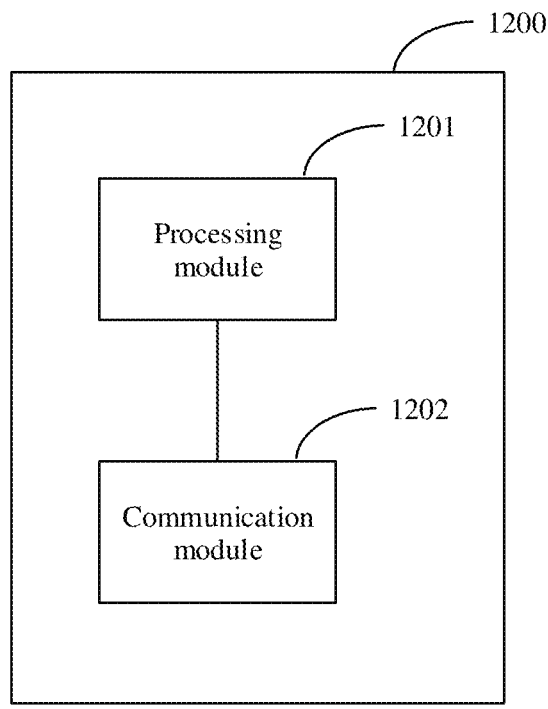
FIG. 12 is a schematic diagram of a structure of a communication apparatus according to at least one embodiment.

As shown in FIG. 12, based on a same technical idea, at least one embodiment further provides an apparatus 1200. The apparatus 1200 is a terminal device or a network device, an apparatus in a terminal device or a network device, or an apparatus that is used with a terminal device or a network device. In a design, the apparatus 1200 includes modules for performing the methods/operations/steps/actions performed by the terminal device or the network device in the foregoing method embodiments. The modules is hardware circuits, is software, or is implemented by using the hardware circuits in combination with the software. In a design, the apparatus includes a processing module 1201 and a communication module 1202. The processing module 1201 is configured to invoke the communication module 1202 to perform a receiving and/or sending function.

In response to being configured to perform the method performed by the terminal:

The communication module 1202 is configured to receive a downlink signal from a network device;

the processing module 1201 is configured to: determine a first reference moment of a signal period of the downlink signal, and determine a timing advance based on the first reference moment and a second reference moment; and the communication module 1202 is further configured to send an uplink signal to the network device based on the timing advance.

For explanations of parameters such as the signal period, the first reference moment, and the second reference moment, refer to the descriptions in the foregoing method embodiments.

The communication module 1202 is further configured to perform an operation that is related to signal receiving or sending and that is performed by the terminal in the foregoing method embodiments. The processing module 1201 is further configured to perform another operation that is performed by the terminal in the foregoing method embodiments and that is other than signal receiving and sending. Details are not described herein again.

In response to the apparatus being configured to perform the method performed by the network device:

The processing module 1201 is configured to: invoke the communication module 1202 to send indication information to a terminal, where the indication information determines, for the terminal, a timing advance for sending an uplink signal; and invoke the communication module 1202 to receive the uplink signal from the terminal. The indication information indicates information about a time interval. The time interval is an interval between a reference moment and a start moment of a period. The reference moment is located in the period. The period is one of durations distributed at equal intervals on a time axis. Alternatively, the indication information indicates an attribute of a duration sequence number of the period on the time axis. The attribute includes an odd number or an even number. Alternatively, the indication information indicates a reference signal period. A difference between a start moment of the reference signal period and a start moment of a period in which the start moment is located is a fixed value. The fixed value is greater than 0, less than 0, or equal to 0.

The communication module 1202 is further configured to perform an operation related to signal receiving or sending and that is performed by the network device in the foregoing method embodiments. The processing module 1201 is further configured to perform another operation performed by the network device in the foregoing method embodiments and that is other than signal receiving and sending. Details are not described herein again.

Division into the modules in at least one embodiment is an example, is merely division into logical functions, and is other division during actual implementation. In addition, functional modules in at least one embodiment is integrated into one processor, or each of the modules exist alone physically, or two or more modules is integrated into one module. The integrated module is implemented in a form of hardware, or is implemented in a form of a software functional module.

Figure 13:
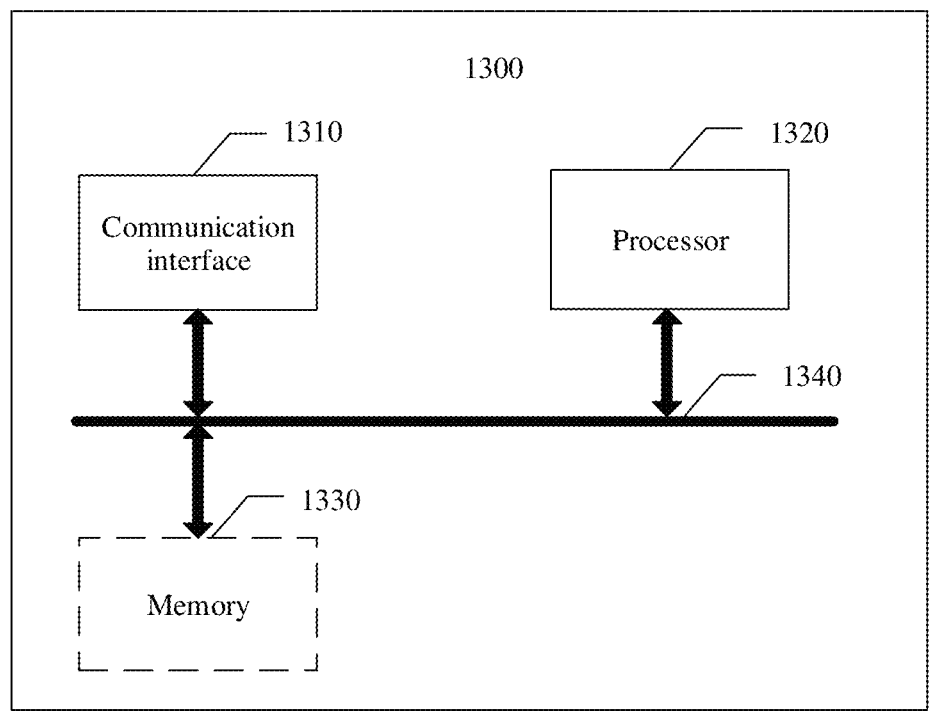
FIG. 13 is a schematic diagram of a structure of another communication apparatus according to at least one embodiment.

FIG. 13 shows a communication apparatus 1300 according to at least one embodiment. The communication apparatus 1300 is configured to implement functions of the terminal device or the network device in the foregoing method. In response to implementing functions of the network device, the apparatus is the network device, is an apparatus in the network device, or an apparatus that is used together with the network device. In response to implementing functions of the terminal device, the apparatus is the terminal device, an apparatus in the terminal device, or an apparatus that is used together with the terminal device. The apparatus is a chip system. In at least one embodiment, the chip system includes a chip, or includes a chip and another discrete component. The communication apparatus 1300 includes at least one processor 1320, configured to implement functions of the terminal device or the network device in the method provided in at least one embodiment. The apparatus 1300 further includes a communication interface 1310. In at least one embodiment, the communication interface is a transceiver, a circuit, a bus, a module, or a communication interface of another type, and is configured to communicate with another device by using a transmission medium. For example, the communication interface 1310 is used by an apparatus in the communication apparatus 1300 to communicate with the another device. For example, in response to the communication apparatus 1300 being a network device, the another device is a terminal device. In response to the communication apparatus 1300 being a terminal device, the another apparatus is a network device. The processor 1320 receives and sends data through the communication interface 1310, and is configured to implement the method in the foregoing method embodiments. For example, In response to a function of the network device being implemented, the processor 1320 is configured to: send indication information to a terminal through the communication interface 1310, and receive an uplink signal from the terminal. The indication information determines, for the terminal, a timing advance for sending the uplink signal. The indication information indicates information about a time interval. The time interval is an interval between a reference moment and a start moment of a period. The reference moment is located in the period. The period is one of durations distributed at equal intervals on a time axis. Alternatively, the indication information indicates an attribute of a duration sequence number of the period on the time axis. The attribute includes an odd number or an even number. Alternatively, the indication information indicates a reference signal period. A difference between a start moment of the reference signal period and a start moment of a period in which the start moment is located is a fixed value. The fixed value is greater than 0, less than 0, or equal to 0.

In response to a function of the terminal device being implemented, the communication interface 1310 is configured to receive a downlink signal from the network device.

The processor 1320 is configured to: determine a first reference moment of a signal period of the downlink signal, and determine a timing advance based on the first reference moment and a second reference moment; and The communication interface 1310 is further configured to send the uplink signal to the network device based on the timing advance.

The processor 1320 and the communication interface 1310 is further configured to perform another corresponding steps or operation performed by the terminal device or the network device in the foregoing method embodiment. Details are not described herein again.

The communication apparatus 1300 further includes at least one memory 1330, configured to store program instructions and/or data. The memory 1330 is coupled to the processor 1320. The coupling In at least one embodiment is an indirect coupling or a communication connection between apparatuses, units, or modules in an electrical form, a mechanical form, or another form, and is used for information exchange between the apparatuses, the units, or the modules. The processor 1320 operates in collaboration with the memory 1330. The processor 1320 executes the program instructions stored in the memory 1330. At least one of the at least one memory is integrated with the processor.

In at least one embodiment, a specific connection medium between the communication interface 1310, the processor 1320, and the memory 1330 is not limited. In at least one embodiment, in FIG. 13, the memory 1330, the processor 1320, and the communication interface 1310 are connected through a bus 1340. The bus is represented by a bold line in FIG. 13. A connection manner between other components is merely an example for description, and is not limited thereto. The bus is classified into an address bus, a data bus, a control bus, and the like. For ease of representation, only one bold line is used to represent the bus in FIG. 13, but this does not mean that there is only one bus or only one type of bus.

In response to the communication apparatus 1200 and the communication apparatus 1300 being chips or chip systems, the communication module 1202 and the communication interface 1310 outputs or receives baseband signals. In response to the communication apparatus 1200 and the communication apparatus 1300 being devices, the communication module 1202 and the communication interface 1310 outputs or receives radio frequency signals. In at least one embodiment, the processor is a general-purpose processor, a digital signal processor, an application-specific integrated circuit, a field programmable gate array or another programmable logic device, a discrete gate or transistor logic device, or a discrete hardware component, and implements or executes the methods, steps, and logical block diagrams disclosed in at least one embodiment. The general purpose processor is a microprocessor or any conventional processor or the like. The steps of the method disclosed with reference to at least one embodiment is directly performed by a hardware processor, or is performed by using a combination of hardware in the processor and a software module.

In at least one embodiment, the memory 1330 is a non-volatile memory, for example, a hard disk drive (HDD) or a solid-state drive (SSD), or is a volatile memory, for example, a random-access memory (RAM). The memory is any other medium that carries or stores expected program code in a form of an instruction or a data structure and that is accessed by a computer, but is not limited thereto. The memory in at least one embodiment alternatively is a circuit or any other apparatus that implements a storage function, and is configured to store the program instructions and/or the data.

Some or all of the operations and functions that are performed by the terminal and that are described in the foregoing method according to at least one embodiment, or some or all of the operations and functions that are performed by the network device and that are described in the foregoing method according to at least one embodiment is completed by using a chip or an integrated circuit.

To implement the functions of the communication apparatus in FIG. 12 or FIG. 13, at least one embodiment further provides a chip, including a processor, configured to support the communication apparatus in implementing the functions of the terminal device or the network device in the foregoing method embodiments. In at least one embodiment, the chip is connected to a memory or the chip includes the memory, and the memory is configured to store program instructions and data that are used for the communication apparatus.

At least one embodiment provides a computer-readable storage medium that stores a computer program. The computer program includes instructions used to perform the foregoing method embodiments.

At least one embodiment provides a computer program product including instructions. In response to the computer program product running on a computer, the computer is enabled to perform the foregoing method embodiments.

A person skilled in the art understands that at least one embodiment is provided as a method, a system, or a computer program product. Therefore, at least one embodiment uses a form of hardware only embodiments, software only embodiments, or embodiments with a combination of software and hardware. In addition, at least one embodiment uses a form of a computer program product that is implemented on one or more computer-usable storage media (including but not limited to a disk memory, a CD-ROM, an optical memory, and the like) that include computer-usable program code.

Embodiments are described herein with reference to the flowcharts and/or block diagrams of the method, the device (system), and the computer program product. Computer program instructions are used to implement each process and/or each block in the flowcharts and/or the block diagrams and a combination of a process and/or a block in the flowcharts and/or the block diagrams. These computer program instructions is provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions is stored in a computer-readable memory that instructs the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions are alternatively loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some embodiments have been described, a person skilled in the art is able to make changes and modifications to these embodiments once the person skilled in the art learns the basic inventive concept. Therefore, the following claims are intended to be construed as to cover at least one embodiment and all changes and modifications falling within the scope of at least one embodiment.

Clearly, persons skilled in the art is able to make various modifications and variations without departing from the scope of embodiments described herein. At least one embodiment is intended to cover these modifications and variations provided that they fall within the scope of protection defined by the following claims and their equivalent technologies.

What is claimed is:

1. A method for determining a timing advance, applied to a communication apparatus, comprising:
receiving a downlink signal from a network device, and determining a start receiving moment of a signal period of the downlink signal, wherein the signal period is a sending period in which the downlink signal is sent;
determining the timing advance based on the start receiving moment and a start sending moment of the signal period of the downlink signal, wherein the start sending moment is determined based on a first time interval, the first time interval is a first interval between the start receiving moment and a start moment of a first period of a plurality of periods, the start receiving moment is located in the first period of the plurality of periods having durations distributed at an equal spacing on a time axis, and the first period of the plurality of periods has a first duration on the time axis; and
sending an uplink signal to the network device based on the timing advance;
wherein at least a portion of the signal period is in the first period of the plurality of periods.

2. The method according to claim 1, wherein the start sending moment is located in a second period having a second duration on the time axis; and
the method further includes:
determining whether the start receiving moment and the start sending moment are in a same period; and
determining the start sending moment based on a determining result.

3. The method according to claim 2, wherein a second interval between the start sending moment and a second start moment of the second period is a second time interval; and
the determining whether the start receiving moment and the start sending moment are in the same period includes:
in response to the first time interval not being less than the second time interval, the start receiving moment and the start sending moment are in the same period, and the second period is equal to the first period; or
in response to the first time interval being less than the second time interval, the start receiving moment and the start sending moment are not in the same period, and the first period follows the second period on the time axis.

4. The method according to claim 2, wherein a second interval between the start sending moment and a second start moment of the second period is a second time interval, and wherein the determining the start sending moment based on the determining result includes:
in response to the determining result being that the start receiving moment and the start sending moment are in the same period, determining that the start sending moment is a first moment obtained by postponing the first start moment of the first period by the second time interval; and
in response to the determining result being that the start receiving moment and the start sending moment are not in the same period, determining that the start sending moment is a second moment obtained by postponing the second start moment of the second period by the second time interval, and the second start moment of the second period is a third moment obtained by advancing the first start moment of the first period by a third interval.

5. The method according to claim 2, wherein the method further comprises:
receiving first indication information from the network device, wherein the first indication information indicates an attribute of a duration sequence number of the second period on the time axis, and the attribute includes an odd number or an even number;
the determining whether the start receiving moment and the start sending moment are in the same period includes:
determining, based on the first indication information, whether attributes of duration sequence numbers of the first period and the second period on the time axis match, in response to the attributes of the duration sequence numbers of the first period and the second period on the time axis matching, determining that the start receiving moment and the start sending moment are in the same period, and the second period is equal to the first period; and in response to the attributes of the duration sequence numbers of the first period and the second period on the time axis not matching, determining that the start receiving moment and the start sending moment are not in the same period, and the first period follows the second period.

6. The method according to claim 1, wherein a second interval between the start sending moment and a second start moment of the second period is a second time interval, and wherein the method further comprises:
receiving second indication information from the network device, wherein the second indication information indicates a reference signal period, a difference between a start sending moment of the reference signal period and a third start moment of a third period is a first fixed value, the first fixed value is greater than or equal to 0, and the start sending moment of the reference signal period is located in the third period; and
determining the second time interval based on a distance between a start moment of the signal period of the downlink signal and the start sending moment of the reference signal period, wherein the second time interval is determined by adding the distance and the first fixed value and then performing a modulo operation on one period.

7. The method according to claim 2, wherein the method further comprises:
receiving third indication information from the network device, wherein the third indication information indicates the second time interval, the second time interval is a time value or a quantity, the quantity indicates a quantity of time units included in the second time interval, and the period is divided into a plurality of time units.

8. The method according to claim 1, wherein the determining the timing advance based on the start receiving moment and the start sending moment includes:
the timing advance is a difference multiplied by two, and the difference is between the start receiving moment and the start sending moment; or
the timing advance is a sum or a difference between a difference multiplied by 2 and an adjustment value, and the adjustment value is related to one of a signal processing time or relative movement between the network device and the communication apparatus.

9. A method for determining a timing advance, comprising:
sending indication information to a terminal, wherein the indication information determines, for the terminal, the timing advance for sending an uplink signal, the indication information indicates information about a first time interval, the first time interval is a first interval between a reference moment and a start moment of a first period, the reference moment is located in the first period, and the first period of periods having durations distributed at equal spacing on a time axis; or the indication information indicates an attribute of a duration sequence number of the first period on the time axis, and the attribute includes an odd number or an even number; or the indication information indicates a reference signal period, a difference between a start sending moment of the reference signal period and a start moment of the first period in which the start moment is located is a fixed value, and the fixed value is greater than 0, less than 0, or equal to 0; and
receiving the uplink signal from the terminal;
wherein the attribute value is an integer, and the fixed value is a real number.

10. The method according to claim 9, wherein the method further comprises:
periodically sending a downlink signal based on a signal period, wherein a start sending moment of the signal period is the reference moment, or the start sending moment of the signal period is a combined moment determined by combining the reference moment and a delay compensation value.

11. The method according to claim 9, wherein in response to the indication information indicating the information about the first time interval, the indication information is a time value or a quantity, the quantity indicates a quantity of time units included in the first time interval, and the period is divided into a plurality of time units.

12. A communication apparatus, comprising at least one processor and at least one non-transitory medium, wherein the at least one non-transitory medium is configured to store program instructions, wherein in response to executing the program instructions, the at least one processor is enabled to:
receive a downlink signal from a network device;
determine a start receiving moment of a signal period of the downlink signal, wherein the downlink signal is sent in the signal period; and determine a timing advance based on the start receiving moment and a start sending moment of the signal period of the downlink signal, wherein the start sending moment is determined based on a first time interval, the first time interval is a first interval between the start receiving moment and a first start moment of a first period of a plurality of periods, the start receiving moment is located in the first period of the plurality of periods having durations distributed at an equal spacing on a time axis, and the first period of the plurality of periods has a first duration on the time axis; and
send an uplink signal to the network device based on the timing advance;
wherein at least a portion of the signal period is in the first period of the plurality of periods.

13. The apparatus according to claim 12, wherein the start sending moment is within a second period having a second duration on the time axis; and
the at least one processor is further enabled to:
determine whether the start receiving moment and the start sending moment are in a same period; and
determine the start sending moment based on a determining result.

14. The apparatus according to claim 13, wherein a second interval between the start sending moment and a second start moment of the second period is a second time interval; and
in response to the processor determining whether the start receiving moment and the start sending moment are in the same period, the at least one processor is enabled to:
in response to the first time interval not being less than the second time interval, determine that the start receiving moment and the start sending moment are in the same period, and the second period is equal to the first period; or
in response to the first time interval being less than the second time interval, determine that the start receiving moment and the start sending moment are not in the same period, and the first period follows the second period.

15. The apparatus according to claim 13, wherein a second interval between the start sending moment and a second start moment of the second period is a second time interval, and wherein the at least one processor determines that the start sending moment is based on a determining result the at least one processor is further enabled to:

in response to the determining result being that the start receiving moment and the start sending moment are in the same period, determining that the start sending moment is a second moment obtained by postponing the first start moment of the first period by the second time interval; and in response to the determining result being that the start receiving moment and the start sending moment are not in the same period, determining that the start sending moment is a second moment obtained by postponing the second start moment of the second period by the second time interval, and the second start moment of the second period is a third moment obtained by advancing the first start moment of the first period by a third interval.

16. The apparatus according to claim 13, wherein the at least one processor is further enabled to receive first indication information from the network device, wherein the first indication information indicates an attribute of a duration sequence number of the second period on the time axis, and the attribute includes an odd number or an even number;

in response to the at least one processor determining whether the start receiving moment and the start sending moment are in the same period, the at least one processor is enabled to:

determine, based on the first indication information, whether attributes of duration sequence numbers of the first period and the second period on the time axis are the same, in response to the attributes of the duration sequence numbers of the first period and the second period on the time axis match, determine that the start receiving moment and the start sending moment are in the same period, and the second period is equal to the first period; and in response to the attributes of the duration sequence numbers of the first period and the second period on the time axis not matching, determine that the start receiving moment and the start sending moment are not in the same period, and the first period follows the second period.

17. The apparatus according to claim 13, wherein the at least one processor is further enabled to:

receive third indication information from the network device, wherein the third indication information indicates the second time interval, the second time interval is a time value or a quantity, the quantity indicates a quantity of time units included in the second time interval, and the period is divided into a plurality of time units.

18. The apparatus according to claim 12, wherein a second interval between the start sending moment and a second start moment of the second period is a second time interval, and wherein the at least one processor is further enabled to:

receive second indication information from the network device, wherein the second indication information indicates a reference signal period, a difference between a start sending moment of the reference signal period and a third start moment of a third period is a first fixed value, the first fixed value is greater than or equal to 0, and the start sending moment of the reference signal period is located in the third period; and the at least one processor is further enabled to determine the second time interval based on a distance between a start moment of the signal period of the downlink signal and the start sending moment of the reference signal period, wherein the at least one processor determines the second time interval by adding the distance and the first fixed value and then performing a modulo operation on one period.

* * * * *